(12) United States Patent
Piccionelli et al.

(10) Patent No.: US 11,641,860 B2
(45) Date of Patent: May 9, 2023

(54) CAKE DECORATION SYSTEM

(71) Applicants: Gregory A. Piccionelli, Westlake Village, CA (US); Gregory B. Gulliver, Grayslake, IL (US)

(72) Inventors: Gregory A. Piccionelli, Westlake Village, CA (US); Gregory B. Gulliver, Grayslake, IL (US)

(*) Notice: Subject to any disclaimer, the term of this patent is extended or adjusted under 35 U.S.C. 154(b) by 282 days.

(21) Appl. No.: 16/690,087

(22) Filed: Nov. 20, 2019

(65) Prior Publication Data

US 2020/0154721 A1 May 21, 2020

Related U.S. Application Data

(60) Provisional application No. 62/769,962, filed on Nov. 20, 2018.

(51) Int. Cl.
| | |
|---|---|
| *A21D 13/47* | (2017.01) |
| *F21V 35/00* | (2006.01) |
| *A23G 3/34* | (2006.01) |
| *H04W 4/80* | (2018.01) |

(52) U.S. Cl.
CPC ........... *A21D 13/47* (2017.01); *A23G 3/0097* (2013.01); *F21V 35/003* (2013.01); *H04W 4/80* (2018.02)

(58) Field of Classification Search
CPC .... A21D 13/47; A23G 3/0097; F21V 35/003; F21S 4/10; F21S 6/001; F21S 10/04
See application file for complete search history.

(56) References Cited

U.S. PATENT DOCUMENTS

| | | | |
|---|---|---|---|
| 7,248,230 B2* | 7/2007 | Piccionelli | H05B 47/155 345/2.1 |
| 2007/0003894 A1* | 1/2007 | Yu | F21V 23/0442 431/126 |
| 2007/0154857 A1* | 7/2007 | Cho | C11C 5/008 431/253 |
| 2007/0285921 A1* | 12/2007 | Zulim | F21V 23/04 362/240 |
| 2008/0198595 A1* | 8/2008 | Lai | F21S 6/001 362/234 |
| 2009/0002981 A1* | 1/2009 | Knibbe | G01S 5/14 362/233 |
| 2015/0369432 A1* | 12/2015 | Li | F21V 23/003 362/249.02 |
| 2018/0094778 A1* | 4/2018 | Sokol | H01R 33/92 |

* cited by examiner

*Primary Examiner* — Andrew J Coughlin
*Assistant Examiner* — Nathaniel J Lee
(74) *Attorney, Agent, or Firm* — Gregory B. Golliver

(57) ABSTRACT

A cake decoration that enables visual shows controlled by a controller that is either remote to the decoration or integral with the decoration.

20 Claims, 30 Drawing Sheets

CAKE DECORATION SYSTEM

TECHNICAL FIELD

The present invention relates generally to holiday decorations and more particularly to food decoration.

RELATED APPLICATIONS

The present application claims priority to the U.S. Provisional Application No. 62/769,962, filed on Nov. 20, 2018, titled CAKE DECORATION and is incorporated by reference fully herein.

BACKGROUND

It is common for celebrations, such as holidays and birthdays to be celebrated with food, such as cakes. Traditionally frosting is used to decorate cakes for different occasions and writing messages. Within the last few years, printing with edible ink has been used with frosting to allow images to be placed on cakes. In addition to the frosting, candles, candleholders, and plastic devices, such as toys and images have been put on cakes. But, candles and frosting decorations are fleeting and have limited reusability. Further, the designs and types of decorations are limited.

SUMMARY

Reusable decorations for food that enable light and sound to be integrated into a display. The decorations may be controlled by a wireless device or self-contained in the decoration. Audio and visual display performances are created and executed by the decoration devices.

In some embodiments a cake decoration device ("CDD") or a plurality of CDDs that communicates and/or interacts with one or more CDDs and/or one or more external devices. Such configurations of the invention are sometimes referred to as a cake display system ("CDS").

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

Remaining Figures are diagrams of user interface displayed on a smart device in accordance with an example implementation.

DETAILED DESCRIPTION

A celebration decoration approach is described that is suitable for a cake that enables visual and audible display shows. A remote controller such as a smart device may control the show or an onboard controller may be configured to control the show depending upon the embodiment. In some implementations of the invention the smart device comprises a smartphone, such as an iPhone®, iPad®, Android® Phone, tablet, a computer, etc., running a suitable control program or application.

Figure 1:
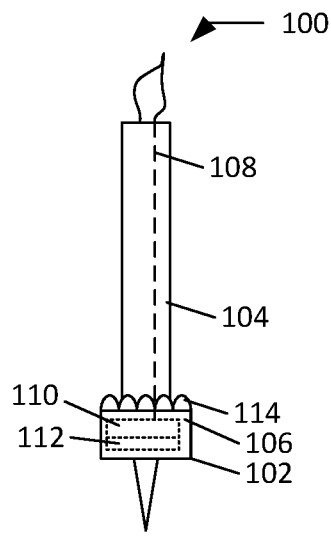
FIG. 1 is a diagram of a candle holder with a candle having a control area and flame detector in accordance with an example implementation of the invention.

In FIG. 1, a diagram 100 of a candle holder 102 with a candle 104 having a control area 106 and flame detector 108 is depicted in accordance with an example implementation of the invention. The candle holder 102 has a controller 110, power supply 112 and light-emitting diodes (LEDs) 114. An example of a flame detector 108 is a thermocouple that runs the length of the candle 104, that when burned activates the controller 110 and results in the activation of a program, display, and/or "show" using the LEDs. In other implementations, additional devices, speakers, displays, microphones, and cameras may be controlled by the controller and part of the show.

Figures 2A, 2B:
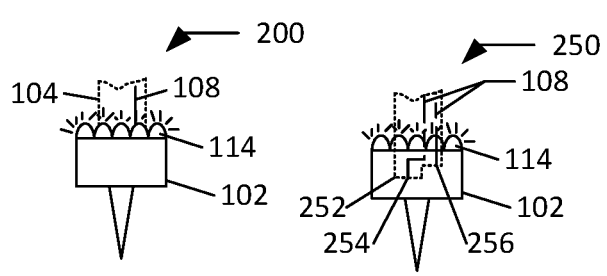
FIG. 2A is a diagram of the candle holder of FIG. 1 with the light-emitting elements illuminated in accordance with an example implementation.
FIG. 2B is a diagram of the candle holder of FIG. 1 with an offset candle holder well in accordance with an example implementation.

Turning to FIG. 2A, a diagram 200 of the candle holder 102 of FIG. 1 with the light-emitting elements 114 illuminated is depicted in accordance with an example implementation. The candle 104 portion may be made of wax with the flame detector 108 inside. In other implementations, a thermocouple or other flame detector 108 may be applied to the outside of the candle. In yet other implementations, the candle may be an electric candle and have one or more devices for turning it on and off, such as a switch, sensor, receiver, transmitter, or transceiver.

Turning to FIG. 2B, a diagram 250 of the candle holder 102 of FIG. 1 with an offset candle holder well 252 is depicted in accordance with an example implementation. The bottom of the candle holder well 252 has two contact points 254 and 256 for the leads of the flame detector (thermocouple) 108. The flame detector may be implemented as a single element in the candle 104 (as shown in FIG. 2A) or multiple elements (as shown in FIG. 2B). An advantage of the offset candle holder well 252 is it aids in aligning the candle 104 in a known orientation for connections with the contact points. The connection points are depicted as pads, but in other implementations, pins, slots, springs, or other known approaches for making removable electrical contacts may be employed. In yet other implementations, the candle holder well may have a flat bottom rather than an offset.

Figure 3:
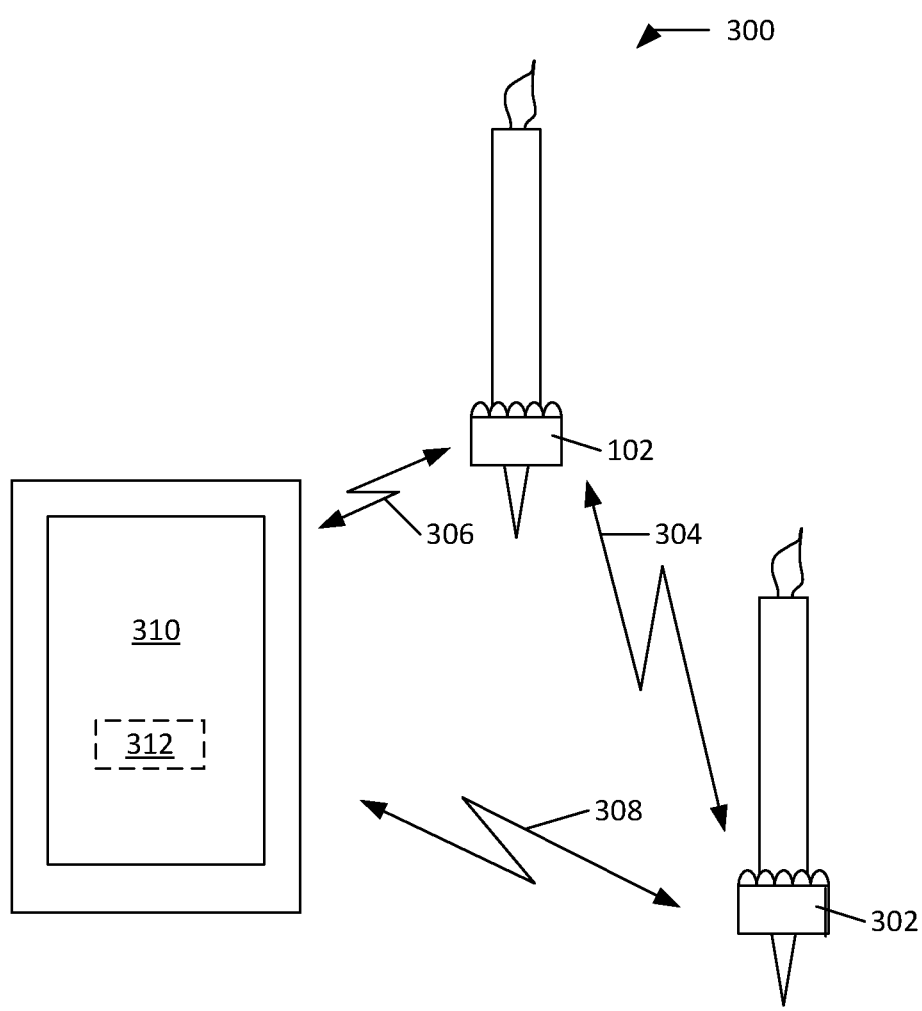
FIG. 3 is a diagram of multiple candle holders as depicted in FIG. 1 that communication between themselves and a smart device in accordance with an example implementation.

In FIG. 3, a diagram 300 of candle holder 102 as depicted in FIG. 1 and candle holder 302 (multiple candle holders) that communicate 304, 306, and 308 between themselves 102, 302 and a smart device 310 are depicted in accordance with an example implementation. In such implementations of the invention a smart device 310 with a processor/controller 312 executing appropriate software or application(s) is in communication, (Bluetooth, wifi, infrared, etc. . . . ) with the controllers in the candle holders 102, 302 and controls the show. The candles holders 102, 302 are similar to ornaments and lights on a Christmas tree being controlled by a user interface on a smart device or at least creating a show that is downloaded by the smart device, such as smart device 310. The communication between elements of the CDS, such as candle holders and smart devices may be wireless or wired, or a combination of wired and wireless depending upon the embodiment.

Figure 4:
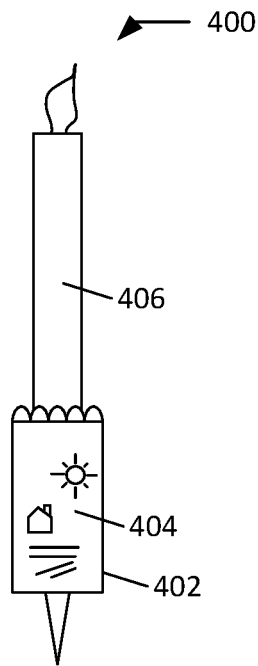
FIG. 4 is a diagram of a candle holder with a display and a candle in accordance with an example implementation of the invention.

Turning to FIG. 4, a diagram 400 of a candle holder 402 with a display 404 and a candle 406 is depicted in accordance with an example implementation of the invention. A bendable of flexible display 404, such as an OLED display, is wrapped around the candle holder 402 (such as a display made by FLEXENABLE LIMITED, 34 Cambridge Science Park, CB4 0FX, UK). In some implementations, the display 404 substantially comprises the body of the candle holder 402. A controller, transceiver, and the power supply are located within the candle holder 402. Depending upon the display 404 and controller, video images or still images, or a combination of video and static images may be incorporated into a show and displayed on the display 404 in some implementations.

Figure 5:
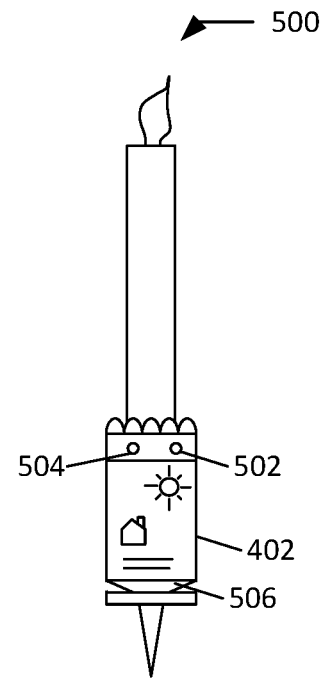
FIG. 5 is a diagram of the candle holder of FIG. 4 that has a camera, microphone, and speaker in accordance with an example implementation.

In FIG. 5 a diagram 500 of the candle holder 402 of FIG. 4 that has a camera 502, microphone 504, and a speaker 506 is depicted in accordance with an example implementation. A controller coupled to a transceiver and speaker 506 and the power supply are located within the candle holder 402. The speaker 506 may play audio that is pre-recorded and loaded into a memory located within the controller or attached to the controller, received from a smart device or other transmitters (i.e. Bluetooth, WiFi, radio, etc.). In some implementations, the audio may be from a remote location, such as from a well-wisher (i.e. grandmother in another state or country) via an application (i.e. Skype, Whatsapp, or custom application) located on a smart device at that remote location. In some implementations, content is transmitted to and received by the candle holder 402 or the CDS device via Bluetooth, WiFi, radio, etc.

Figure 6:
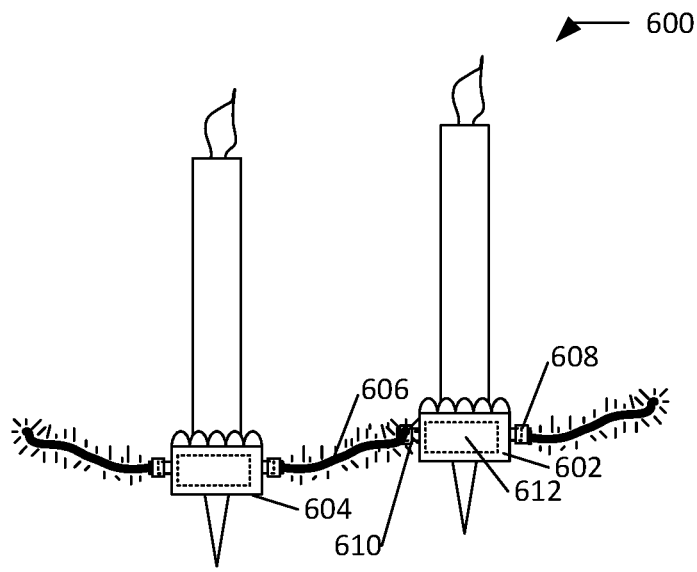
FIG. 6 is a diagram of candle holders that couple together with a bus that enables communication and emits light in accordance with an example implementation of the invention.

Turning to FIG. 6, a diagram 600 of candle holders 602, 604 that couple together with a bus 606 that enables communication and emits light is depicted in accordance with an example implementation of the invention. In other implementations, the bus 606 may not emit light. The candle holders 602 and 604 are hubs that enable a bus (with LED cords in the current implementation) to be connected and controlled. A predetermined number of termination points 608, 610 in the candle holder 602 creates the hub. The termination points supply power and communication bus connections, depending upon the implementation. The LED cords may be a single color or multiple colors depending upon the implementation. Multiple candle holders and at least one controller 612 may be coupled together by the bus and candle holder 602, 604 hubs. A serial communication protocol (such as I²C) may also be used when communication between controllers and devices such as displays and candle holders depending upon the implementation. In other implementations, other types of protocols may be employed.

Figure 7:
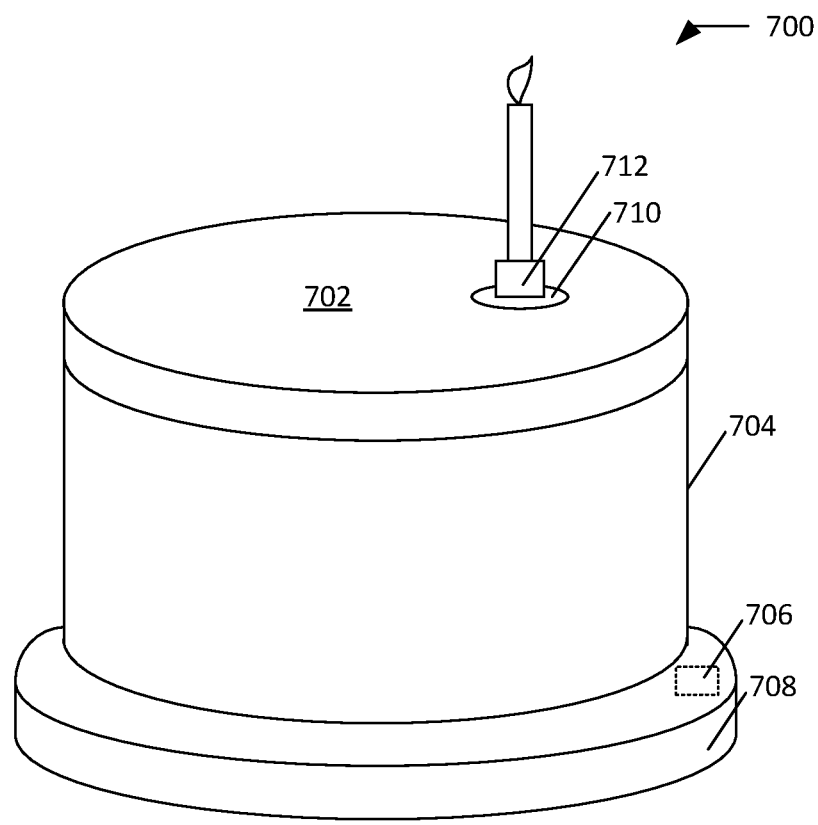
FIG. 7 is a diagram of a display resting on top of a cake with a controller and power supply located in a base in accordance with an example implementation of the invention.

In FIG. 7, a diagram 700 of a display 702 resting on top of a cake 704 with a controller 706 and power supply 708 located in a base is depicted in accordance with an example implementation of the invention. The display (LED, OLED, LCD, or similar display) 702 is located on the top of the cake. Areas of the display may be defined to hold a candle holder 710 for candle holders as previously described, such as candle holder 712. In other implementations, holes may be disposed or defined in the display to enable candles or candle holders to be placed directly into the top of the cake. In some preferred embodiments, the candles or candle holders may comprise electronic candles or display candle holders as previously described. The display 702 is connected via a wire or wirelessly, depending upon the embodiment, to the base that supports the cake 704. The base has a power supply 708 and controller 706 that control the display 702. The power supply 708 in the base may be a battery, wired, induction, or wireless power. In some embodiments, the base includes speakers or other sound generating devices that are capable of generating sound associated with the content displayed on the aforementioned display 702 on top of the cake 704 and/or on one or more of the aforementioned electronic candles.

Figure 8:
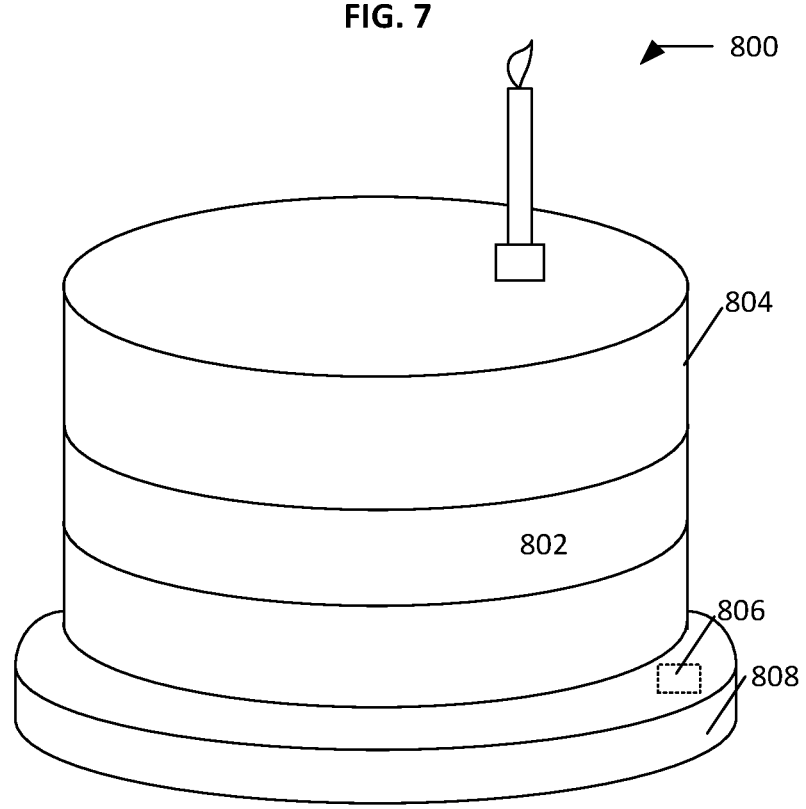
FIG. 8 is a diagram of a display around the side circumference of the cake with a power supply and controller located in a base in accordance with an example implementation of the invention.

Turning to FIG. 8, a diagram 800 of a display 802 around the side circumference of the cake 804 with a power supply 808 and controller 806 located in a base is depicted in accordance with an example implementation of the invention. The display 802 is connected via a wire or wirelessly, depending upon the embodiment, to the base that supports the cake 804. The base has a power supply 808 and controller 806 that control the display 802. The power supply 808 in the base may be a battery, wired, or wireless power. In other embodiments, a display of FIG. 7 and FIG. 8 may both be located on a cake 804. In some implementations of the invention a mechanical turntable is incorporated into the base providing a means for the cake and the CDS to rotate. In some preferred embodiments control of the turntable (start, stop, speed, coordinated play with CDS and other devices, etc.) is by a smart device running code or one or more applications to effectuate such control. In some implementations of the invention, such motion is responsive to cues in a show performed by the CDS.

Figure 9:
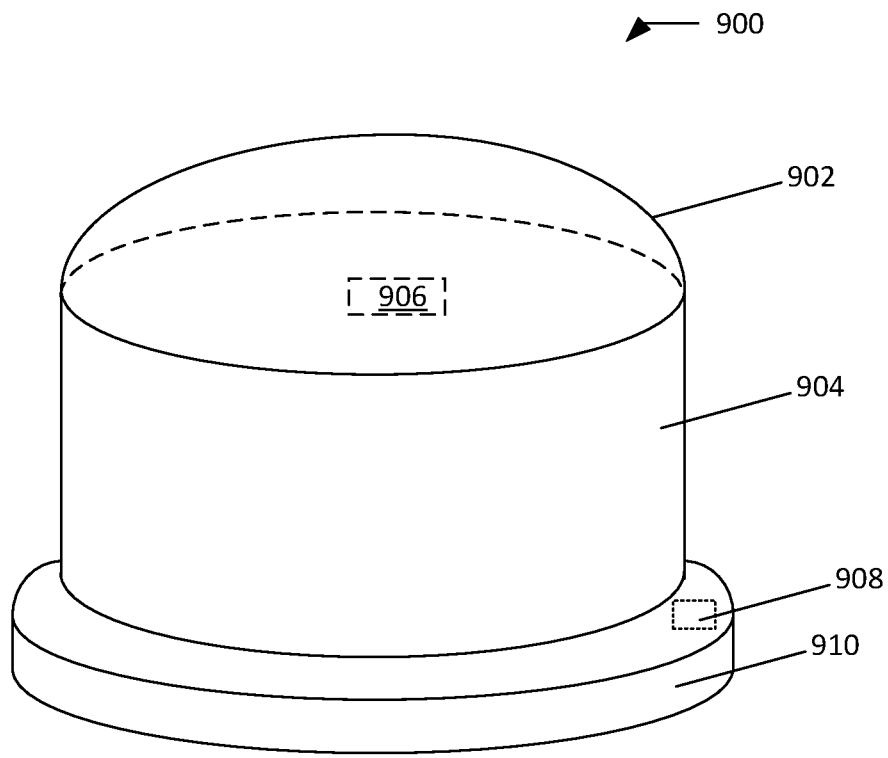
FIG. 9 is a diagram of a screen dome located on top of a cake that receives a projection from a projector with a controller and power supply located in a base in accordance with an example implementation.

FIG. 9 is a diagram 900 of a screen dome 902 located on top of a cake 904 that receives a projection from a projector 906 with a controller 908 and power supply 910 located in a base in accordance with an example implementation. The projector 906 is located under the screen dome 902 and projects an image onto it. The power supply 910 and controller 908 that are coupled to the projector 906 is located in the base. In some embodiments a plurality of projectors is located under the screen dome 902 and multiple simultaneous projections may be viewed. In some embodiments the projection comprises a holographic projection or a 3D video projection. In some embodiments of the invention, a curved or flexible screen is disposed on all or part of the dome.

In some implementations of the invention the base is configured to be a plate for a cake or other foodstuff and the dome is configured to provide a cover that fits over the plate and provides a seal to help keep a cake or other foodstuff disposed on the plate fresh in a manner similar to that used by a Plate Topper™.

Figure 10:
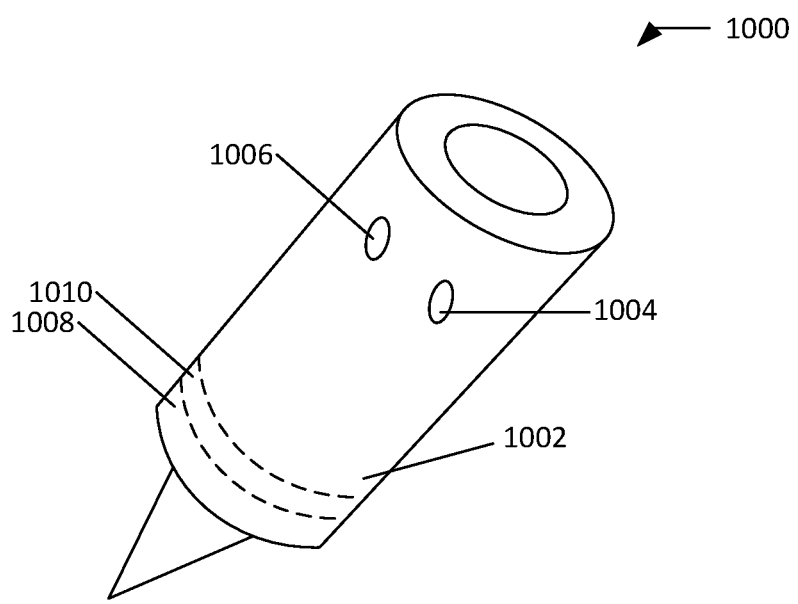
FIG. 10 is a diagram of a candle holder with a microphone and a camera in accordance with an example implementation of the invention.

Turning to FIG. 10, a diagram of a candle holder 1002 with a microphone 1004 and a camera 1006 is depicted in accordance with an example implementation of the invention. A power supply 1008 and controller 1010 may be located within the candle holder. In other implementations, a wired or wireless communication and or power connection may be made to a power supply and controller.

Figure 11:
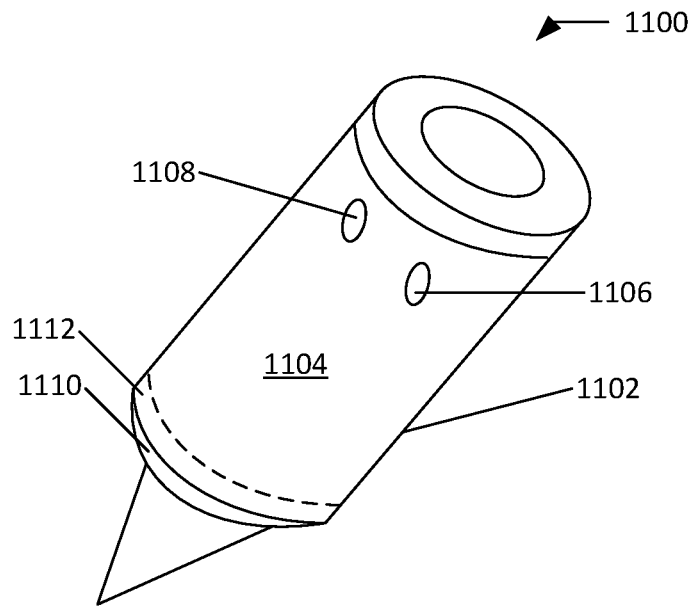
FIG. 11 is a diagram of a candle holder with a screen located around the outside circumference with a microphone and a camera in accordance with an example implementation of the invention.

In FIG. 11, a diagram 1100 of a candle holder 1102 with a screen 1104 located around the outside circumference with a microphone 1106 and a camera 1108 is depicted in accordance with an example implementation of the invention. A power supply 1110 and controller 1112 may be located within the candle holder 1102. In other implementations, a wired or wireless communication via a transceiver and or power connection may be made to a power supply 1110 and controller 1112.

Figure 12:
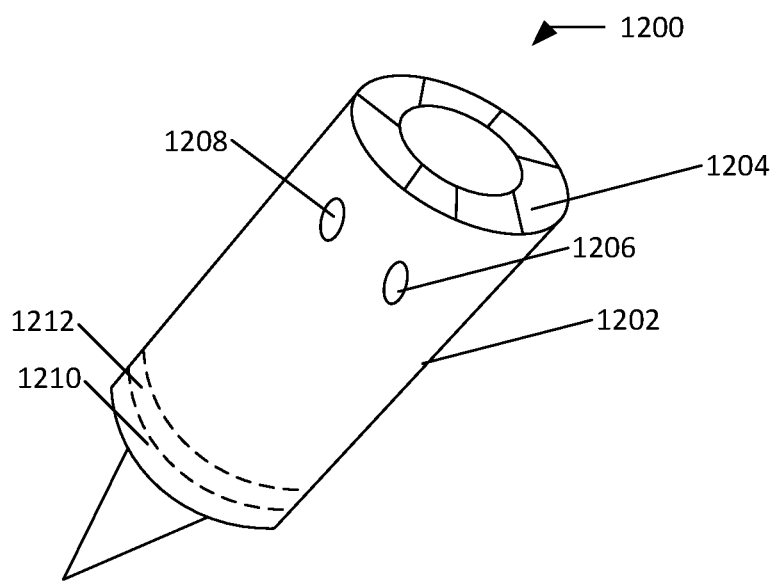
FIG. 12 is a diagram of a candle holder with a display located around the top with a microphone and a camera in accordance with an example implementation of the invention.

Turning to FIG. 12, a diagram 1200 of a candle holder 1202 with a display 1204 located around the top with a microphone 1206 and a camera 1208 in accordance with an example implementation of the invention. A power supply 1210 and controller 1212 may be located within the candle holder. In other implementations, a wired or wireless communication and or power connection may be made to a power supply and controller.

Figure 13:
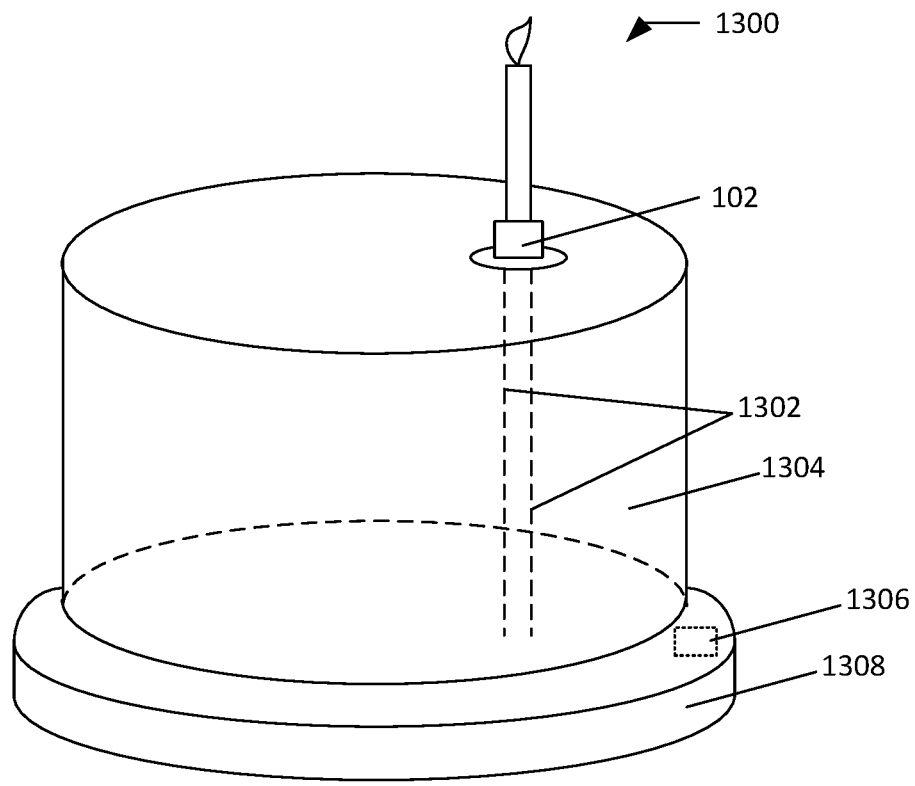
FIG. 13 is a diagram of the candle holder of FIG. 1 with wires connecting the candle through the cake to the controller and power supply located in a base in accordance with an example implementation.

In FIG. 13, a diagram 1300 of the candle holder of FIG. 102 with wires 1302 connecting the candle holder 102 through the cake 1304 to the controller 1306 and power supply 1308 located in a base in accordance with an example implementation. In the current implementation the wires 1302 act as a power and communication bus. In other implementations, the wires 1302 may only be a communication or power bus.

Figure 14:
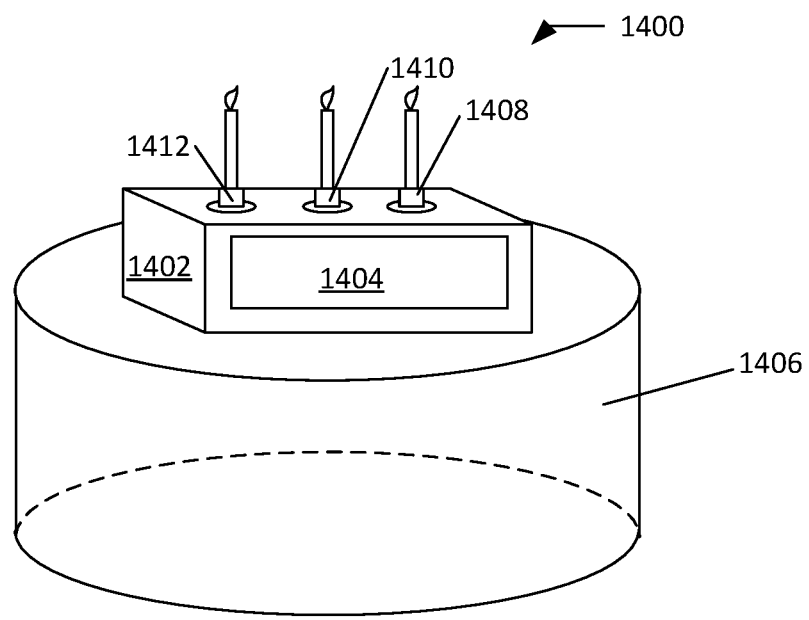
FIG. 14 is a diagram of a block candle holder with a display screen atop a cake in accordance with an example implementation.

FIG. 14 is diagram 1400 of a block candle holder 1402 with a display screen 1404 atop a cake 1406 in accordance with an example implementation. The block candle holder 1402 contains the candle holders 1408, 1410, 1412 integrated into a housing that has a power supply, display 1404, transceiver, and controller.

Figure 15:
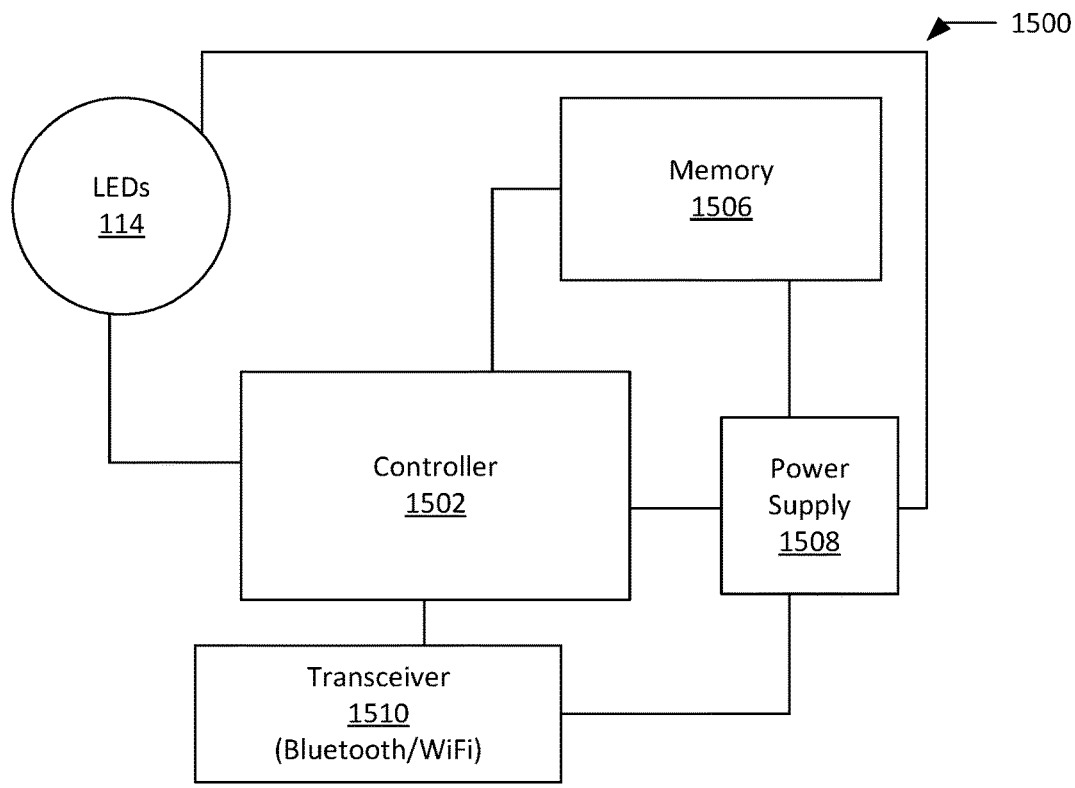
FIG. 15 is a block diagram of the candle holder of FIG. 1 with wires connecting the candle through the cake to the controller and power supply located in a base in accordance with an example implementation.

In FIG. 15, a block diagram 1500 of the candle holder 102 of FIG. 1 is depicted in accordance with an example implementation. A controller 1502 is in communication with LEDs 114, memory 1506, power supply 1508, and transceiver 1510. The transceiver 1510 allows the controller 1502 to communicate with other devices such as a smart device, fragrance device, wearable devices, televisions, or other candle type devices. The controller 1502 may be a microprocessor, such as an INTEL or AMD processor, a microcontroller such as a PARALLAX, Microchip Technology PIC, ATmega328 microcontroller, digital logic implemented as a state machine, analog state machine, or a combination of any of the above. The power supply 1508 may be a battery, capacitor, inductive, wired, or a combination of any of the above. The transceiver 1510 may be a separate transmitter and receiver that enables Bluetooth, WiFi, RF radio, or a combination of the above. In some embodiments, the smart device comprises a smartphone.

Figure 16:
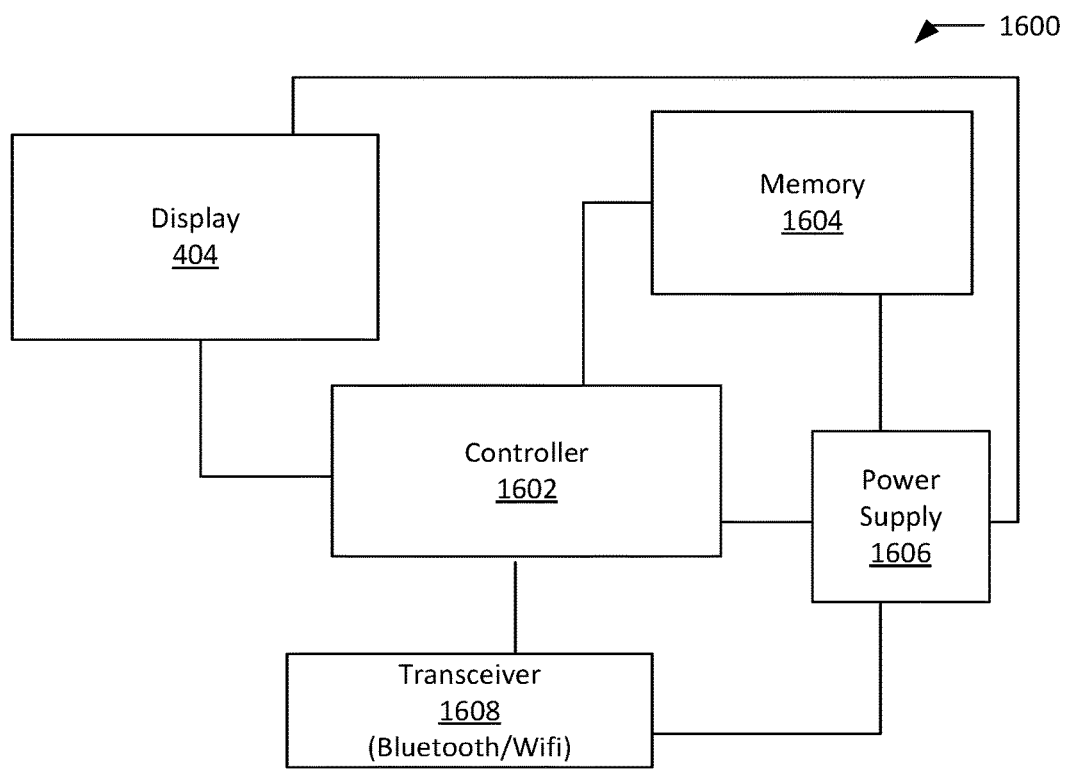
FIG. 16 is a block diagram of the candle of FIG. 4 in accordance with an example implementation.

Turning to FIG. 16, a block diagram 1600 of the candle holder 402 of FIG. 4 is depicted in accordance with an example implementation. A display (LED, OLED, LCD, a cathode-ray tube, or similar technology) 404 is coupled to the controller 1602. The controller 1602 is also coupled to memory 1604, power supply 1606, and transceiver 1608. Other implementations having displays may be implemented in a similar manner.

Figure 17:
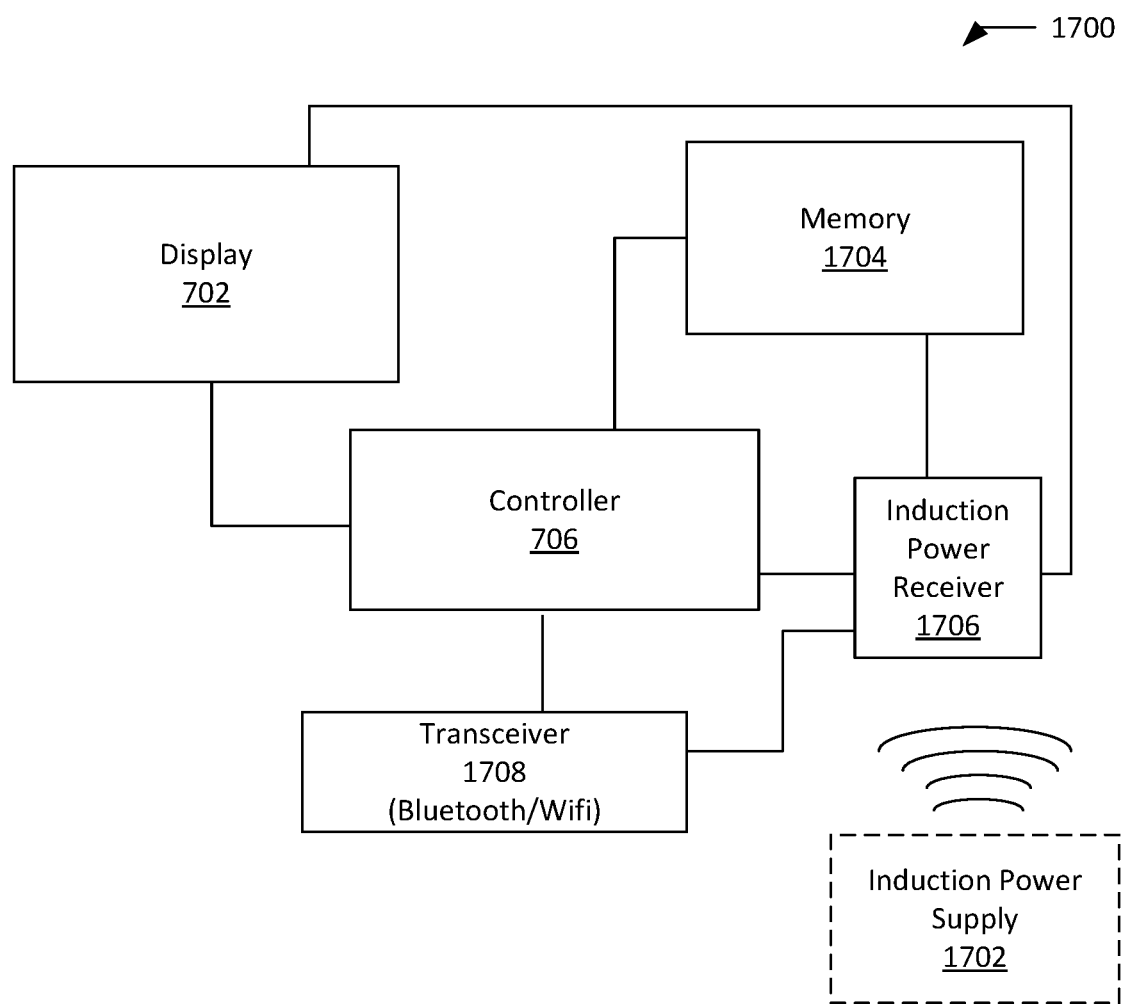
FIG. 17 is a block diagram of the induction powering of a display located on a cake of FIG. 7 in accordance with an example implementation.

In FIG. 17, a block diagram 1700 of induction power supply 1702 powering of a display 702 located on a cake 704 of FIG. 7 in accordance with an example implementation. The controller 706 is coupled to the display 702, memory 1704, transceiver 1708, and an induction power receiver 1706 that is located in base 708. The base is set on top of the induction power supply 1702 and powers the CDS via the induction power receiver 1706.

Figure 18:
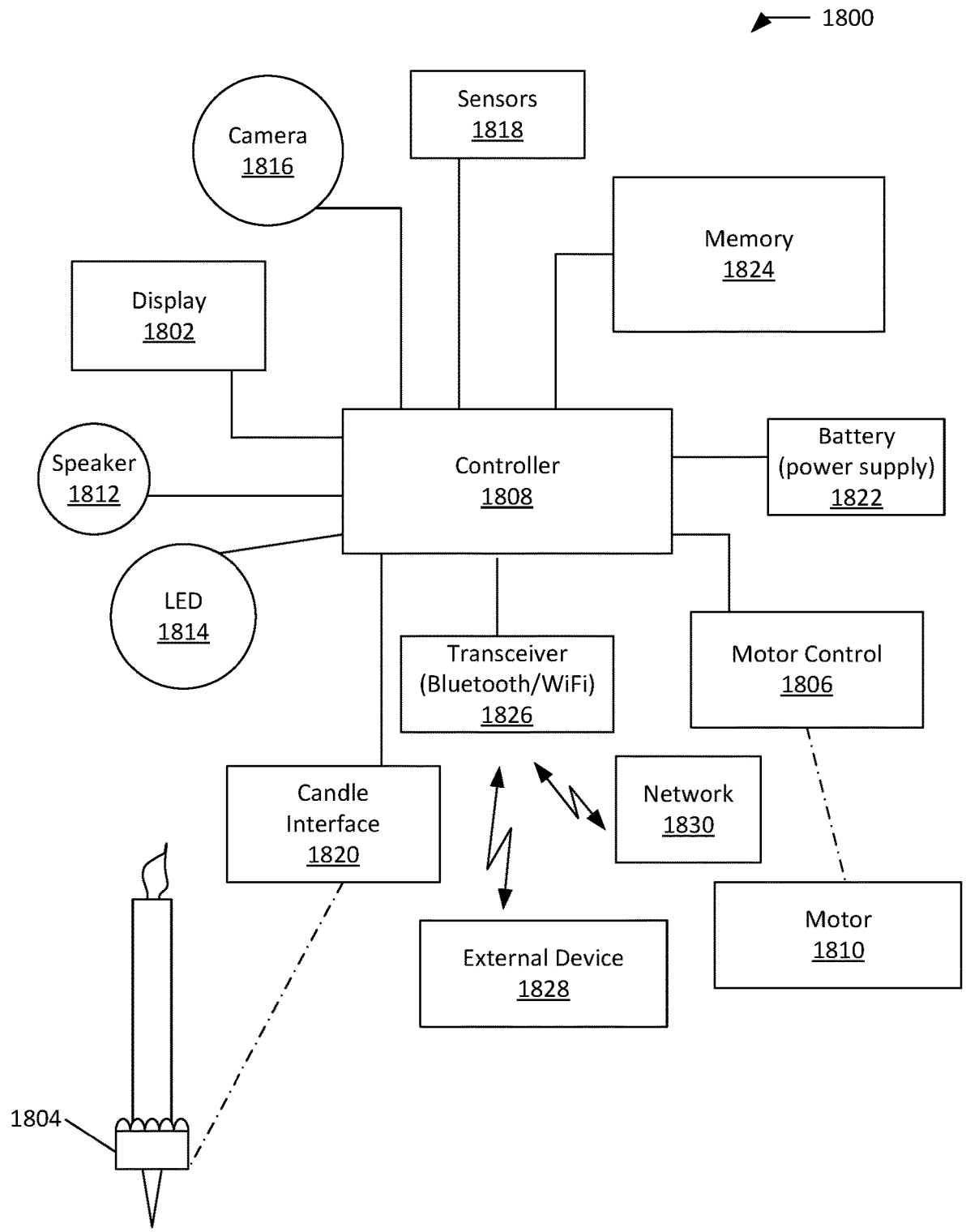
FIG. 18 is a block diagram of a cake display system with displays, candles, and motor in accordance with an example implementation.

In FIG. 18, a block diagram 1800 of a CDS with a display 1802, candle holder 1804, and motor controller 1806 is depicted in accordance with an example implementation. The controller 1808 is coupled to a motor control 1806 that operates a motor 1810 to move a decoration by or on the cake. The controller 1808 is also depicted as coupled to a speaker 1812, LED (lighting element) 1814, camera 1816, sensors 1818, candle interface 1820, along with a battery 1822, memory 1824, display 1802, and transceiver 1826. The transceiver 1826 communicates with external devices 1828, such as smart devices or other CDS decorations, for example, wearables, aroma machines, ornaments, streaming devices, and smart speakers. Sensors 1818 include light, sound, touch, infrared, Relays, buzzers, reed switches, photo-interrupt, Analog-to-Digital/Digital-to-Analog converters, moisture, potentiometers, analog hall sensor, temperature, thermistor, photoresistor, gas, rotary encoder, barometer, level, ultrasonic, and joystick to name but a few examples. The controller may be used to execute a program that is called a "show." A show may integrate music, lights, images, and video that is displayed on one or more displays and speakers of the CDS. Cameras and speakers may be used in the CDS to capture sound and images (still and video) and transmit to external devices 1828 and devices attached to the internet or another network 1830.

Figure 19:
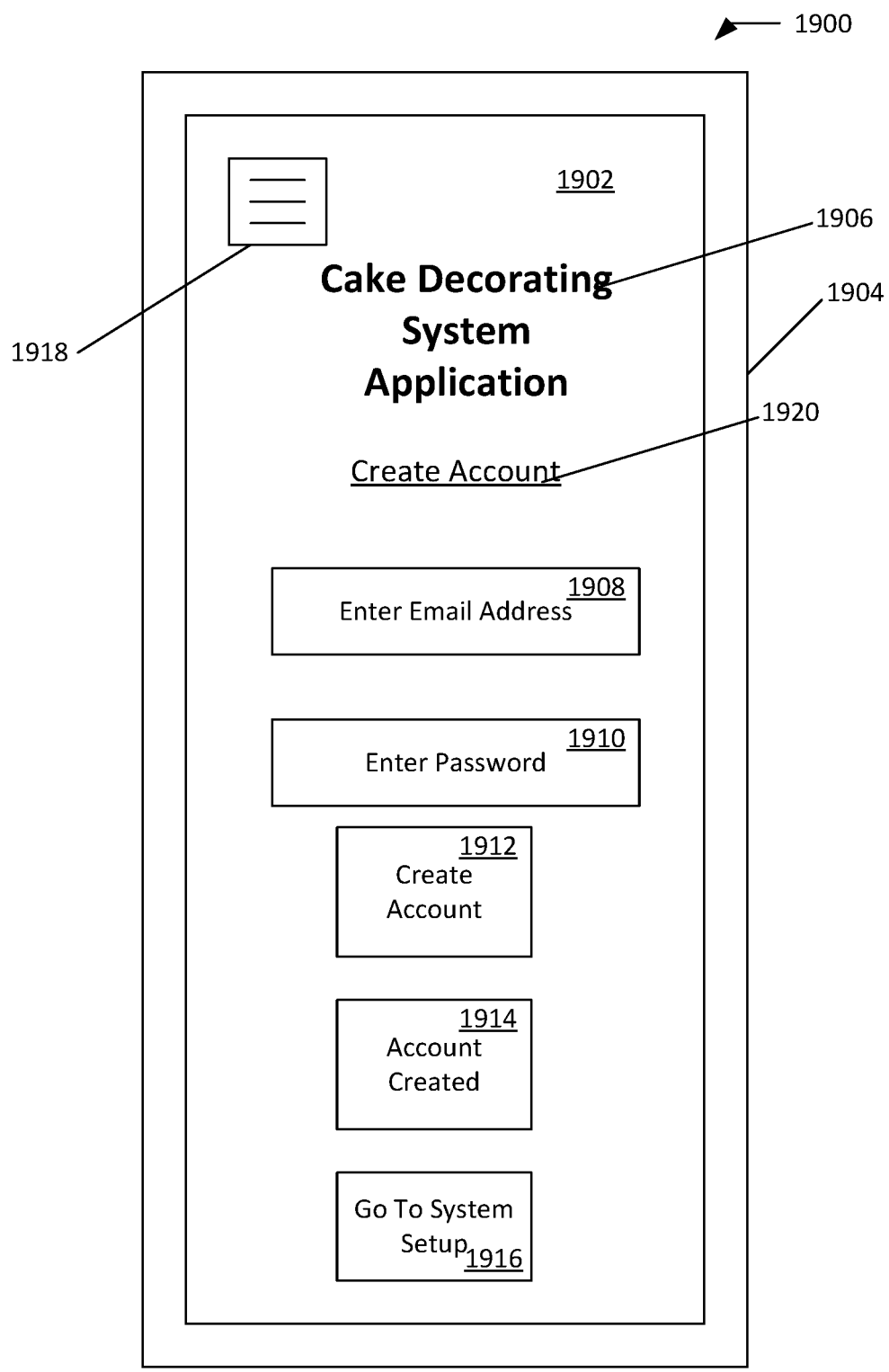
FIG. 19 is a diagram of a screen of a smart device that executes a CDS application with an interface to create a CDS account in accordance with an example implementation.

Turning to FIG. 19 is a diagram 1900 of a screen 1902 of a smart device 1904 that executes a CDS application 1906 with a user interface to create a CDS account 1920 in accordance with an example implementation. A user of the CDS enters an email address in the "Enter Email Address" Box 1908 and a password into the "Enter Password" box 1910. After the data is entered, the "Create Account" button 1912 may be selected. Once a CDS account is created, a confirmation email is sent to the email account (that can also be an email validation confirmation) and an "Account Created" confirmation 1914 displayed on the screen 1902. The user may then go to account setup by selecting the "Go To System Setup" button 1916. It is noted that in some implementations, the "Go To System Setup" button 1916 may be greyed until the email account has been validated. It is noted a pulldown menu 1918 is present in the current implementation and enables a user to go to other screens, such as help screen, access the manual, customer service, jump to other areas of the user interface.

Figure 20:
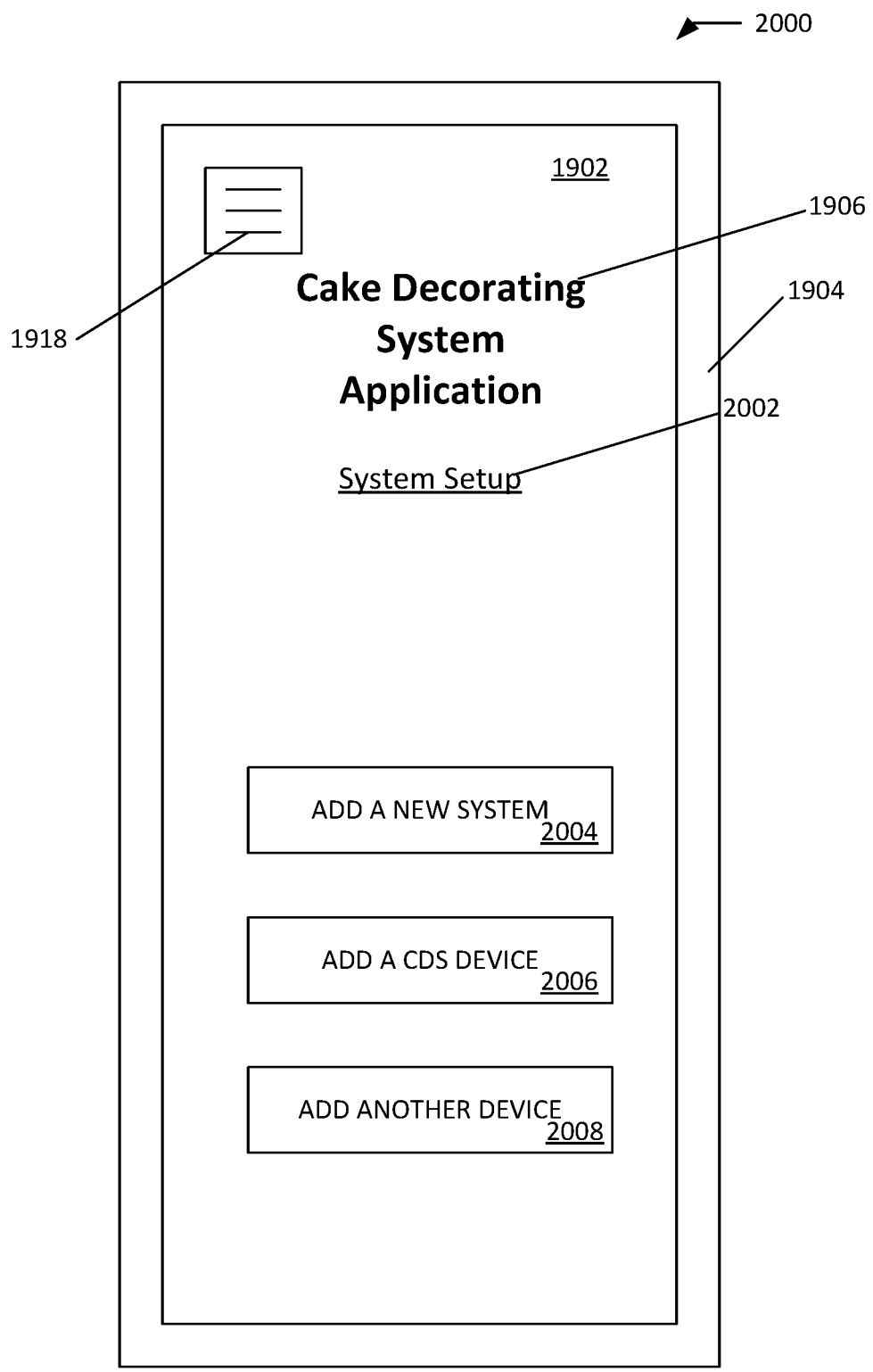
FIG. 20 is a diagram of a screen of a smart device that executes a CDS application with a system setup interface in accordance with an example implementation.

In FIG. 20 a diagram 2000 of a screen 1902 of a smart device 1904 that executes a CDS application 1906 with a system setup interface 2002 is depicted in accordance with an example implementation. A user may add a new CDS system by selecting the "ADD A NEW SYSTEM" button 2004. A CDS device may be added to an existing CDS system by selecting the "ADD A CDS DEVICE" 2006. If a non-CDS device is desired to be added to an existing CDS system, then the "ADD ANOTHER DEVICE" button 2008 is selected. The pulldown menu 1918 is also present on the system setup interface 2002.

Figure 21:
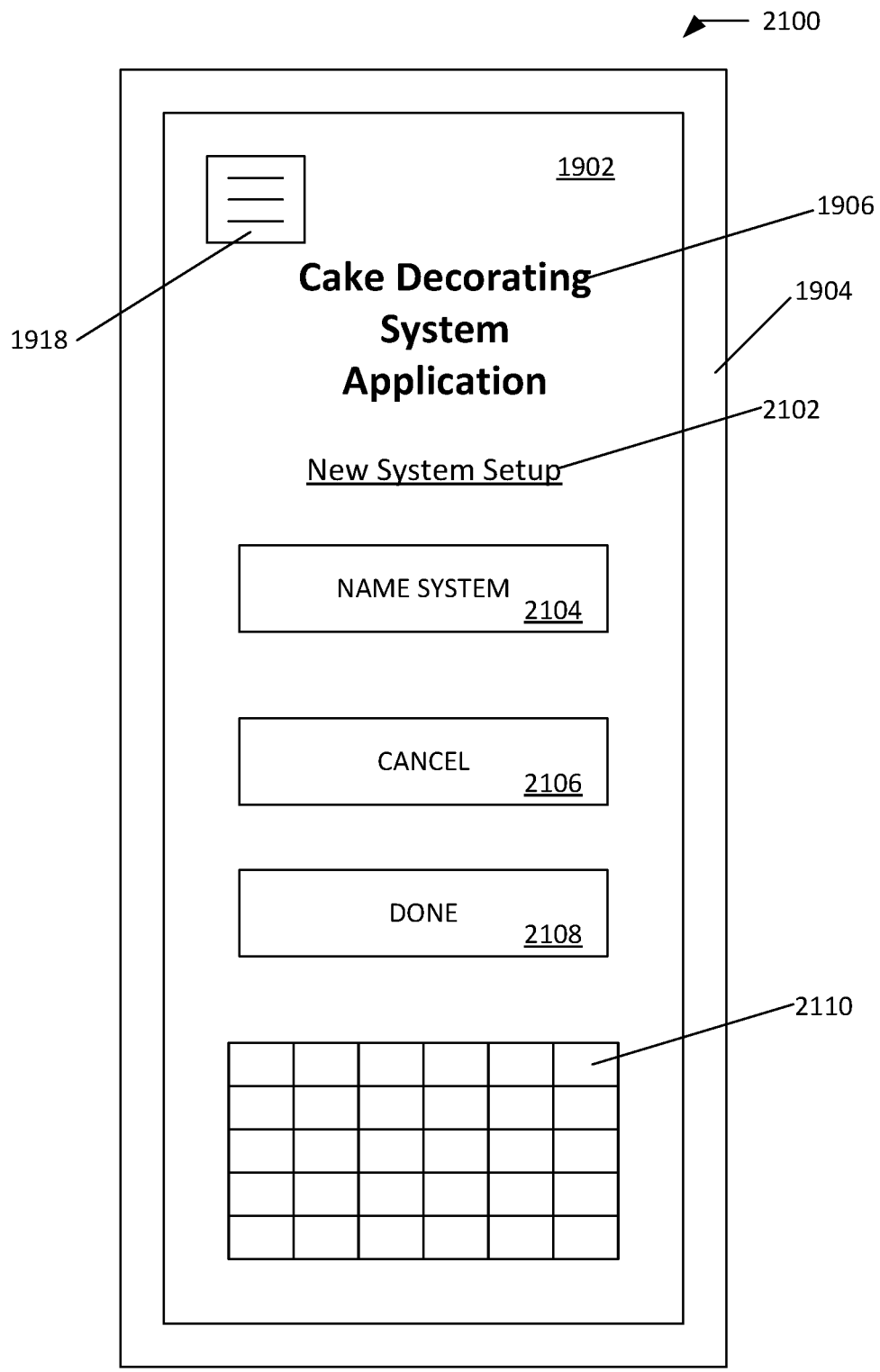
FIG. 21 is a diagram of a screen of a smart device that executes a CDS application with a new system setup interface in accordance with an example implementation.

Turning to FIG. 21, a diagram 2100 of a screen 1902 of a smart device 1904 that executes a CDS application 1906 with a new system setup interface 2102 is depicted in accordance with an example implementation. The name of the CDS system is entered into the "NAME SYSTEM" text box 2104. The setting up of the system may be canceled by selecting the "CANCEL" button 2106 or if a name has been entered into text box 210, the "DONE" button 2108 may be selected to have the system name entered. When text is being entered into a text box, the CDS application 1906 may bring up a soft keyboard 2110 that a user may use to enter text. A pulldown menu 1918 may also be present on the new system setup interface 2102. The entries in the pulldown menu 1918 may change depending upon which system interface page is being accessed.

Figure 22:
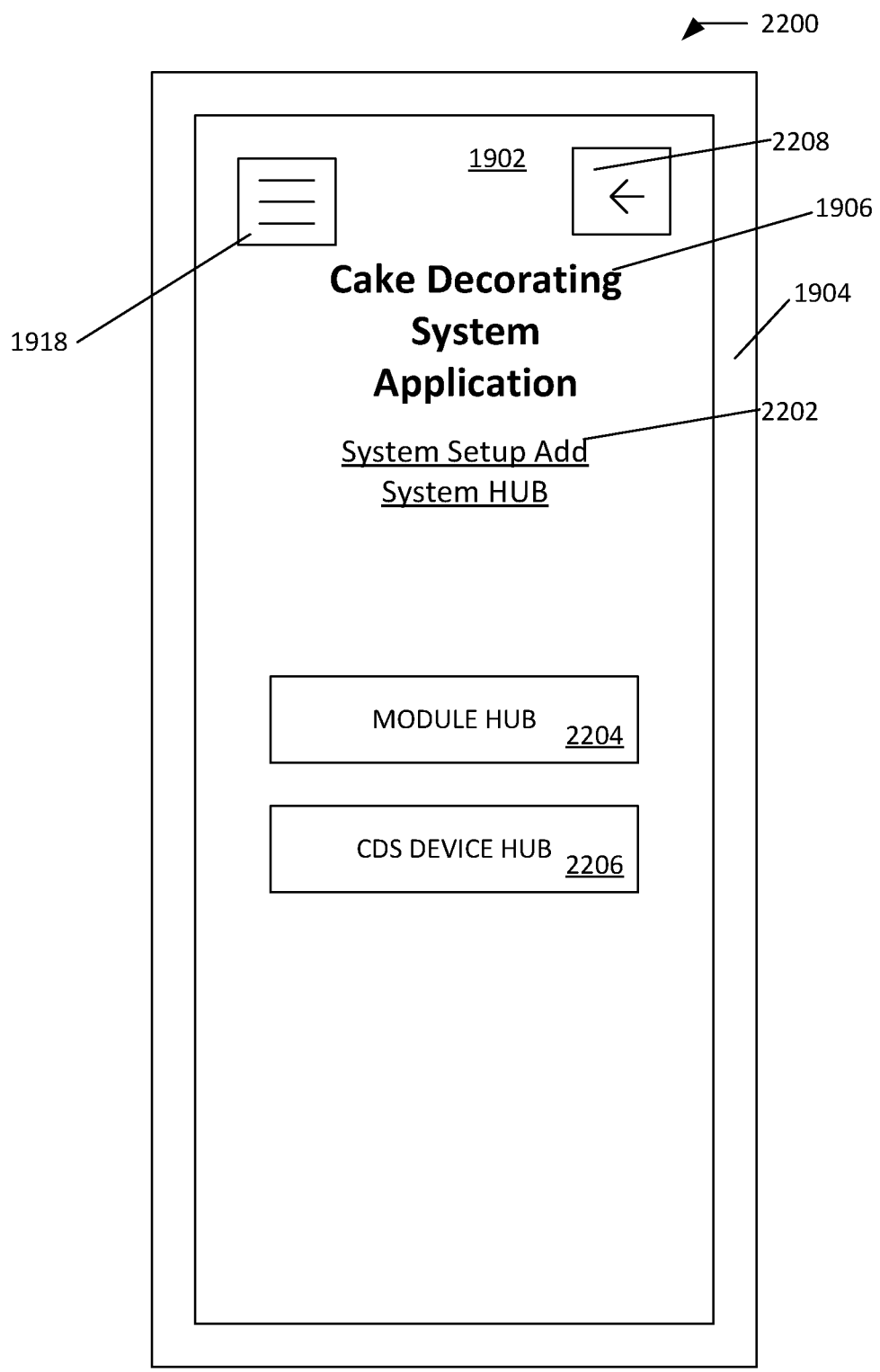
FIG. 22 is a diagram of a screen of a smart device that executes a CDS application that adds a system HUB in accordance with an example implementation.

In FIG. 22, a diagram 2200 of a screen 1902 of a smart device 1904 that executes a CDS application 1906 with an add system HUB interface 2202 is depicted in accordance with an example implementation. In order to add a HUB, the button for the type of HUB to add is selected. A HUB is a device that is able to communicate with and control multiple devices (CDS devices and non-CDS devices) in the CDS system. For a Module HUB (Non-CDS device HUB), the "MODULE HUB" button 2204 is selected. To add a CDS device HUB, the "CDS DEVICE HUB" button 2206 is selected. A pulldown menu 1918 and back button 2208 may also be available on the add system HUB interface 2202.

Figure 23:
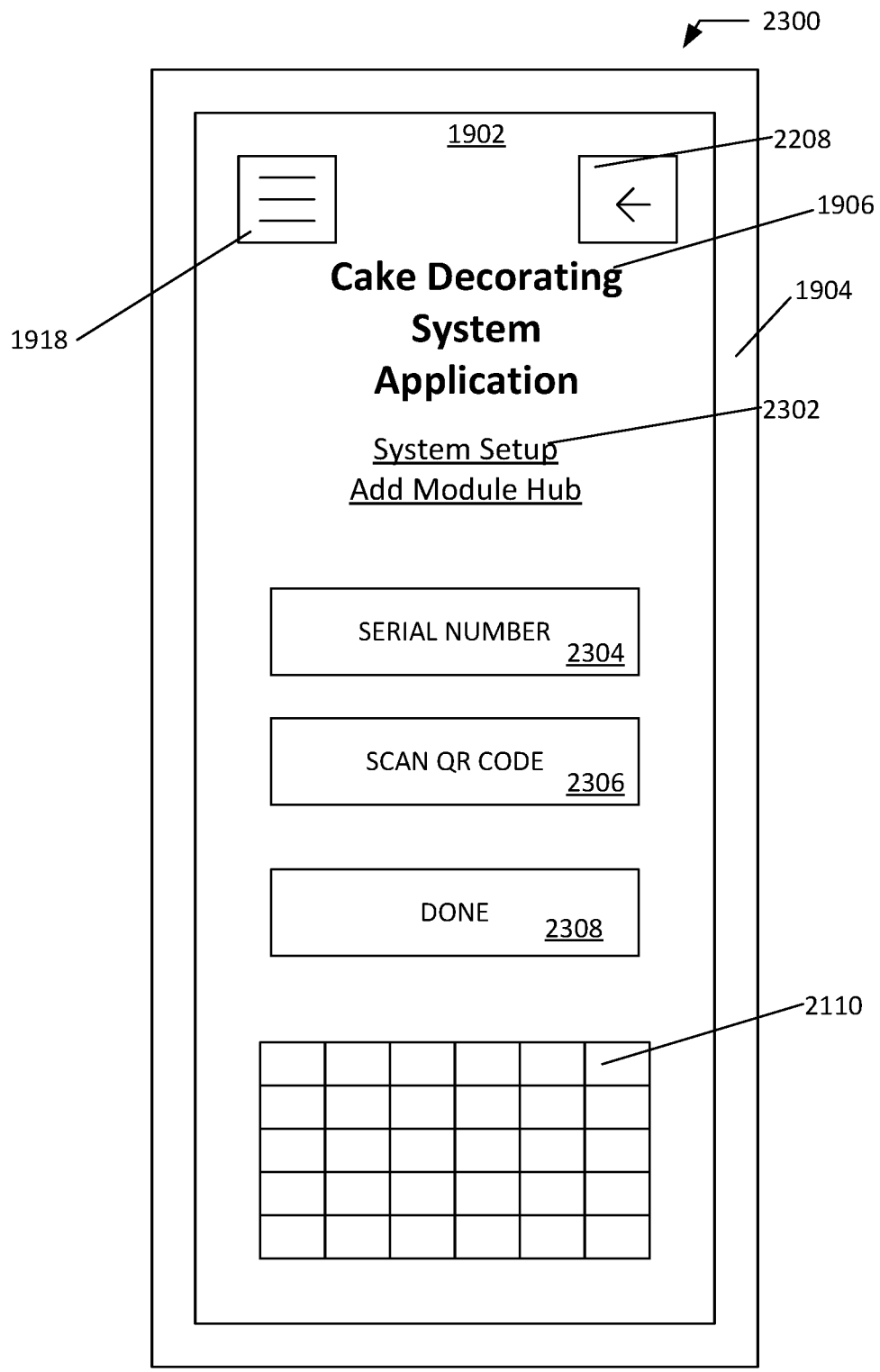
FIG. 23 is a diagram of a screen of a smart device that executes a CDS application that identifies the system HUB of FIG. 22 in accordance with an example implementation.

Turning to FIG. 23, a diagram 2300 of a screen 1902 of a smart device 1904 that executes a CDS application 1906 that identifies the system module HUB interface 2302 for the HUB selected in FIG. 22 is depicted in accordance with an example implementation. The interface is accessed in response to the selection of the "MODULE HUB" button 2204 of FIG. 22. The serial number of the module HUB is entered into the SERIAL NUMBER text box 2304. The soft keyboard 2110 may be presented for entry of the module HUB's serial number. If a QR code is on the module HUB, it may be scanned using a camera that may be part of the smart device 1904. In order to scan a QR code, the "SCAN QR CODE" button 2306 is selected and then the QR code is read by a camera in the smart device 1904. The resulting serial number that is scanned, is then placed into the SERIAL NUMBER text box 204. Once the serial number is entered, the "DONE" button 2308 may be pressed and the entered serial number saved in the memory of the CDS.

Figure 24:
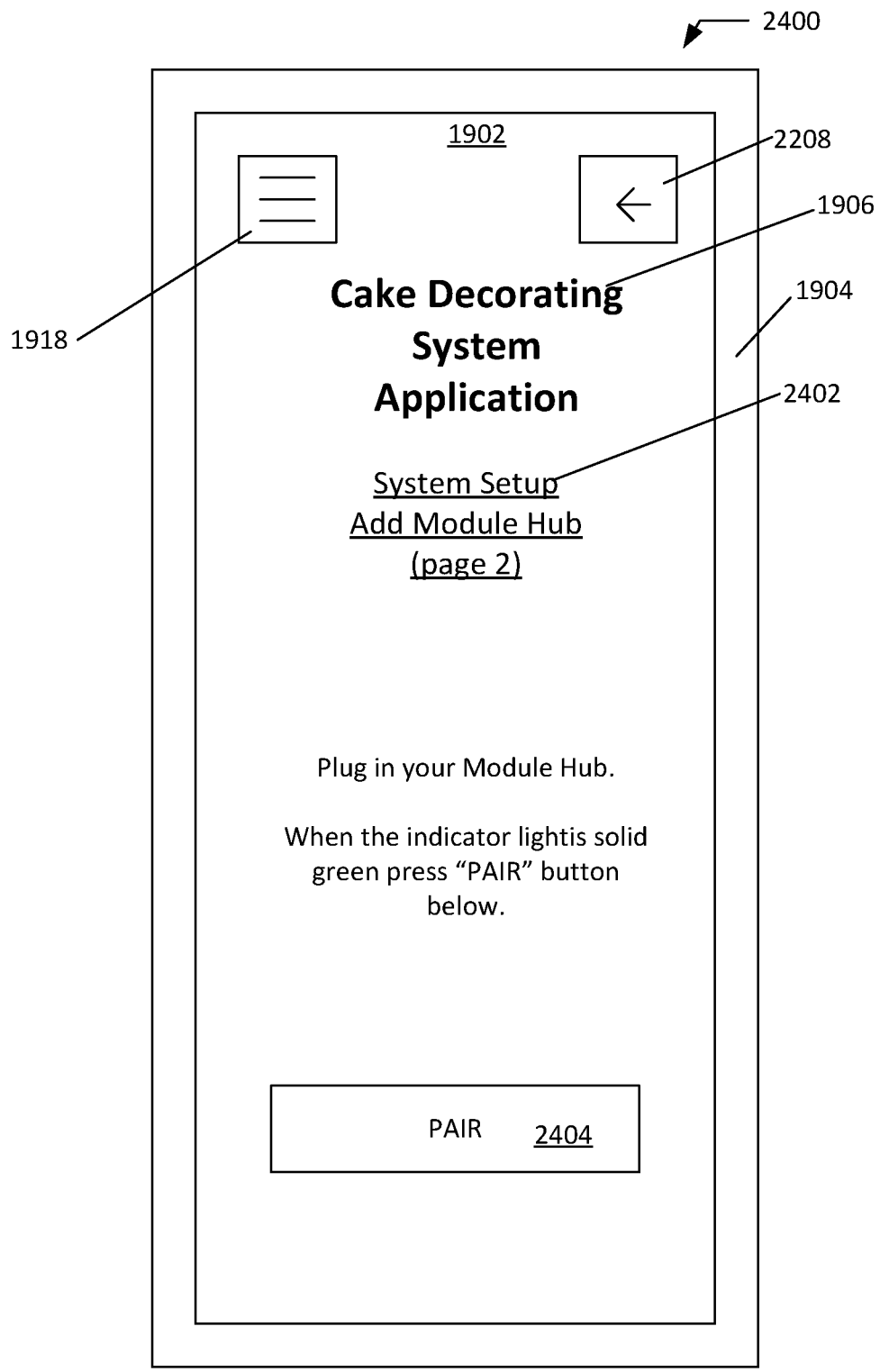
FIG. 24 is a diagram of a screen of a smart device that executes a CDS application pairs the system HUB of FIG. 22 in accordance with an example implementation.

In FIG. 24, a diagram 2400 of a screen 1920 of a smart device 1904 that executes a CDS application 1906 provides an interface 2402 that pairs the system HUB with the CDS for the HUB selected in FIG. 22 is depicted in accordance with an example implementation. The module hub is plugged in and/or energized. Once an indicator, such as a flashing LED light identifies that module hub to be in a pairing state, the "PAIR" button 2404 in the interface 2404 is selected to pair the device with the CDS system. A pulldown menu 1918 and back button 2208 may also be present in the interface 2402.

Figure 25:
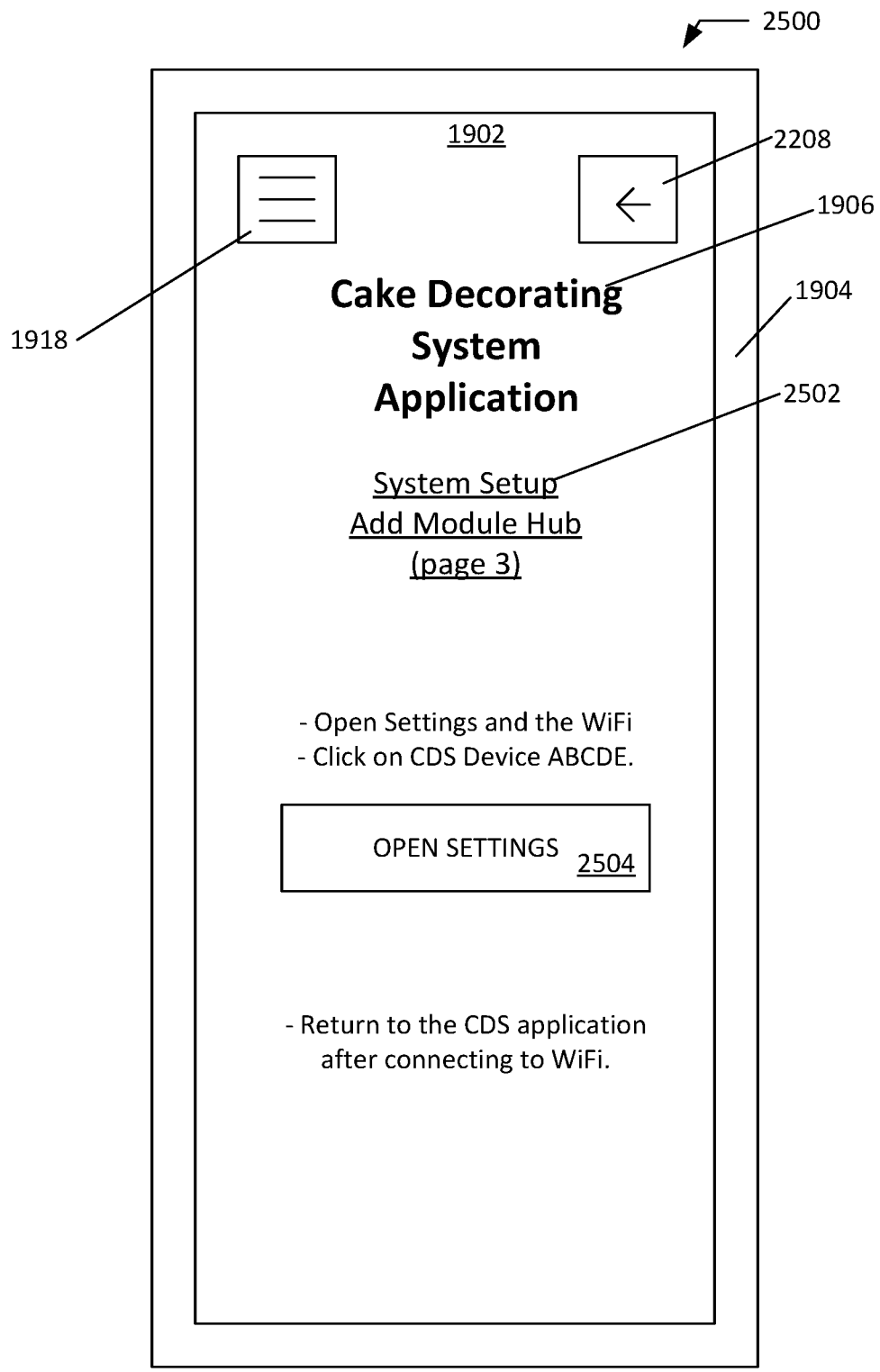
FIG. 25 is a diagram of a screen of a smart device that executes a CDS application and configures WiFi for the system HUB of FIG. 22 in accordance with an example implementation.

In FIG. 25, a diagram 2500 of a screen 1902 of a smart device 1904 that executes a CDS application 1906 and provides an interface 2502 that configures WiFi for the module HUB of FIG. 22 is depicted in accordance with an example implementation. The user is able to open the settings of the paired module HUB by pressing the "OPEN SETTINGS" button 2504. One the module HUB is connected to Wifi, the user is returned to the CDS application 1906. The pulldown menu 1918 and back button 2208 are depicted in the user interface 2502.

Figure 26:
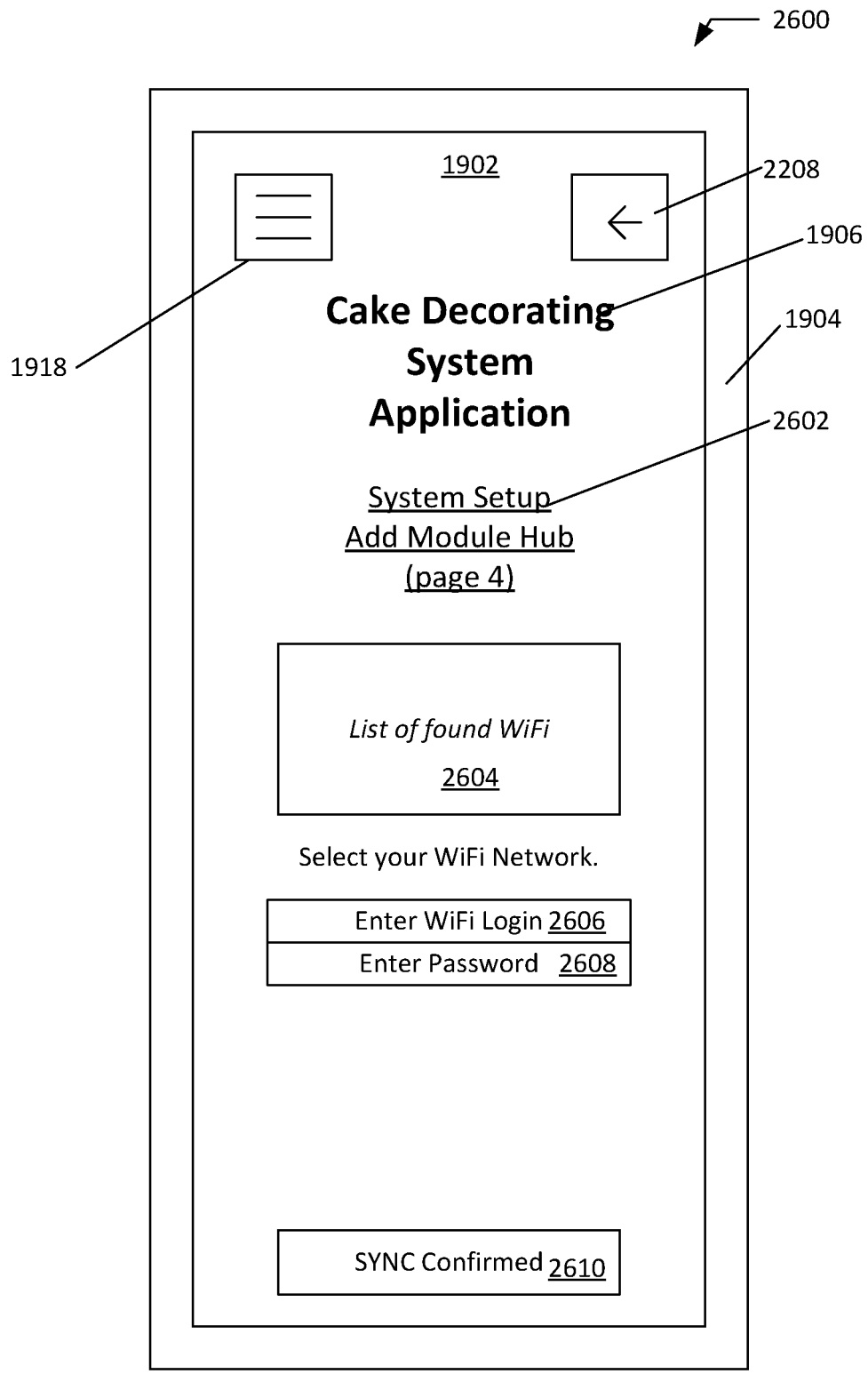
FIG. 26 is a diagram of a screen of a smart device that executes a CDS application for accessing WiFi from the system HUB of FIG. 22 in accordance with an example implementation.

Turning to FIG. 26, a diagram of a screen 1902 of a smart device 1904 that executes a CDS application 1906 with an interface 2602 for accessing WiFi from the module HUB of FIG. 22 is depicted in accordance with an example implementation. A list of found WiFi networks is provided in a window 2604 in the user interface 2502. The user selects which network to join by picking the network in the window 2604 using the touch screen or pointer device of the smart device 1904. Once selected, the login and password are entered in the textboxes 2606 and 2608. Once the data is entered, the SYNC Confirmed indicator 2610 will change color from red to green if the module HUB is operating on the selected WiFi network. The pulldown menu 1918 and back button 2208 are depicted in the user interface 2602.

It is noted that a similar approach (FIGS. 23-26) as used to configure a module HUB is used to configure a CDS device HUB by selecting "CDS DEVICE HUB" button 2206 in figure.

Figure 27:
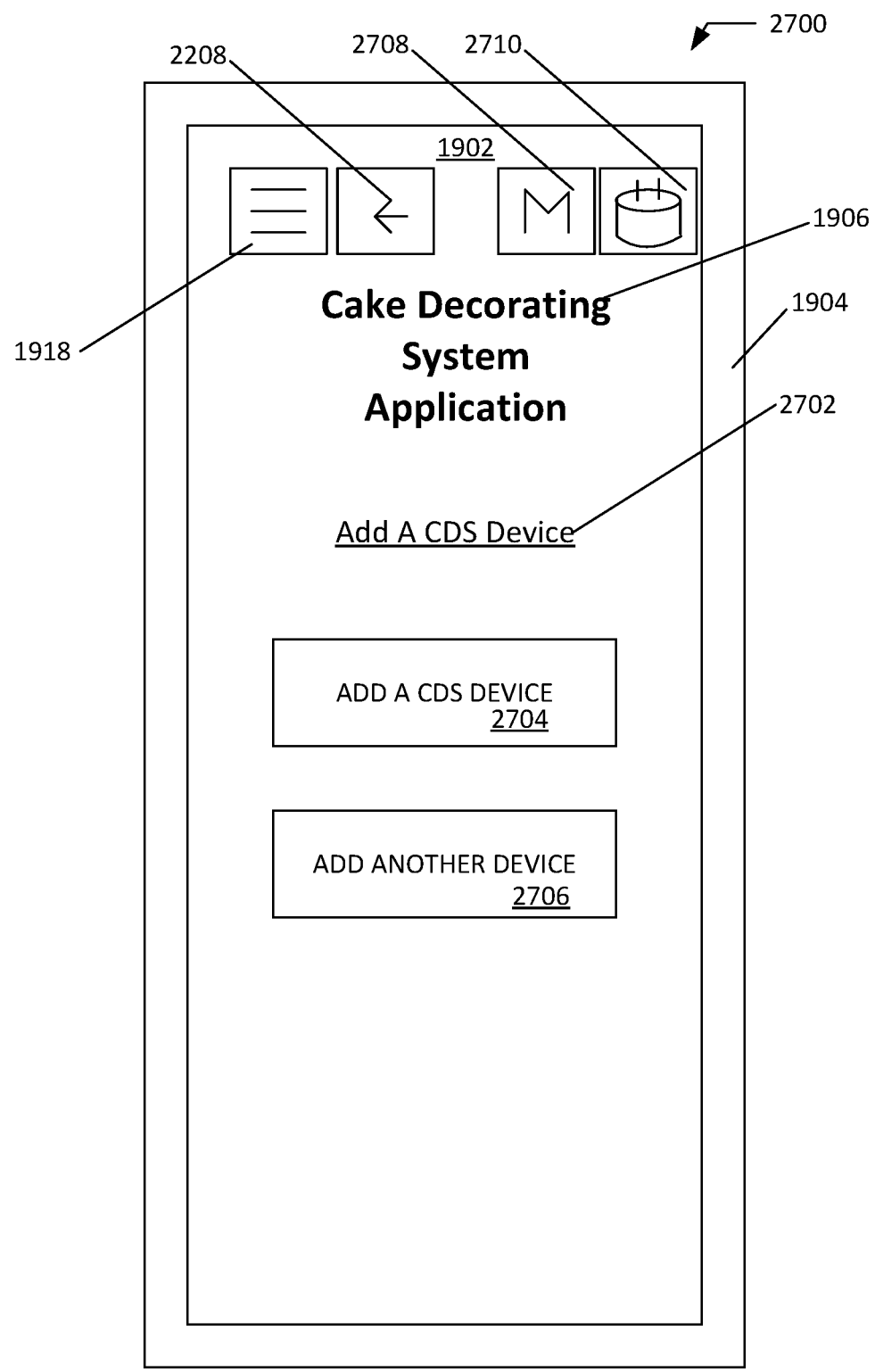
FIG. 27 is a diagram of a screen of a smart device that executes a CDS application that adds a CDS device in accordance with an example implementation.

In FIG. 27, a diagram 2700 of a screen 1902 of a smart device 1904 that executes a CDS application 1906 with an interface 2702 that adds a CDS device to the CDS system is depicted in accordance with an example implementation. The user either selects the button "ADD A CDS DEVICE" 2704 or "ADD ANOTHER DEVICE" 2706 depending upon the type of device being added to the CDS system. A MAIN MENU button 2708 may be present in the interface 2702 for returning to the main menu. A list of CDS devices may also be accessed in the interface 2702 by selecting the CDS DEVICES button 2710.

Figure 28:
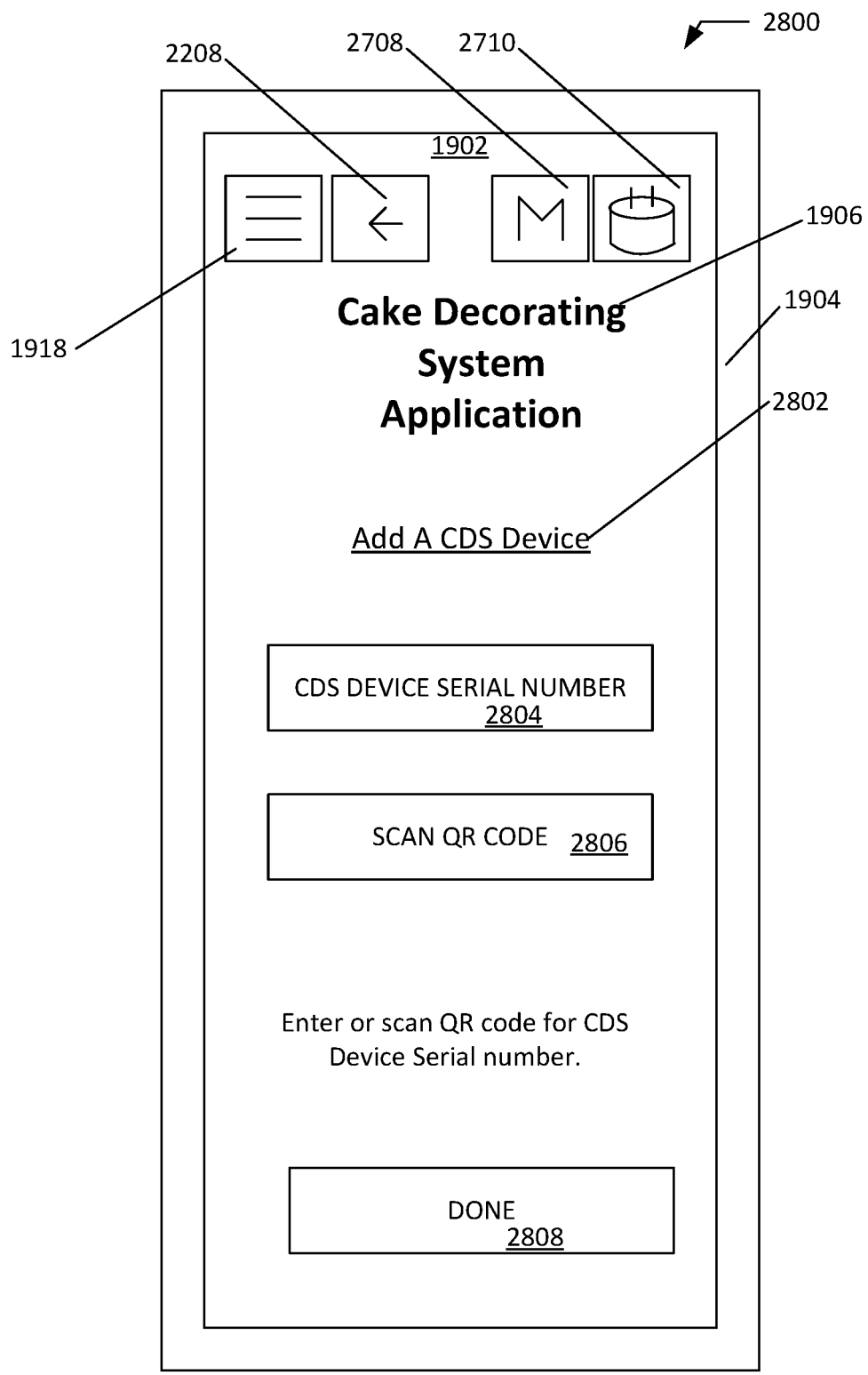
FIG. 28 is a diagram of a screen of a smart device that executes a CDS application that adds a CDS device in accordance with an example implementation.

Turning to FIG. 28, a diagram 2800 of a screen 1902 of a smart device 1904 that executes a CDS application 1906 that has a user interface 2802 that adds a CDS device in accordance with an example implementation. The serial number of the CDS device is added in the text box 2804 either by scanning a QR code with the "SCAN QR CODE" button 2806 or directly entering the data. In other implementations, different codes other than QR codes may be used to enter the serial number. These other codes include codes accessed in a memory or other visible codes that may be mechanically read. Once the serial number is entered in the CDS Device Serial Number textbox 2804 the user may select the "DONE" button 2808 to commit the serial number in the memory of the system.

Figure 29:
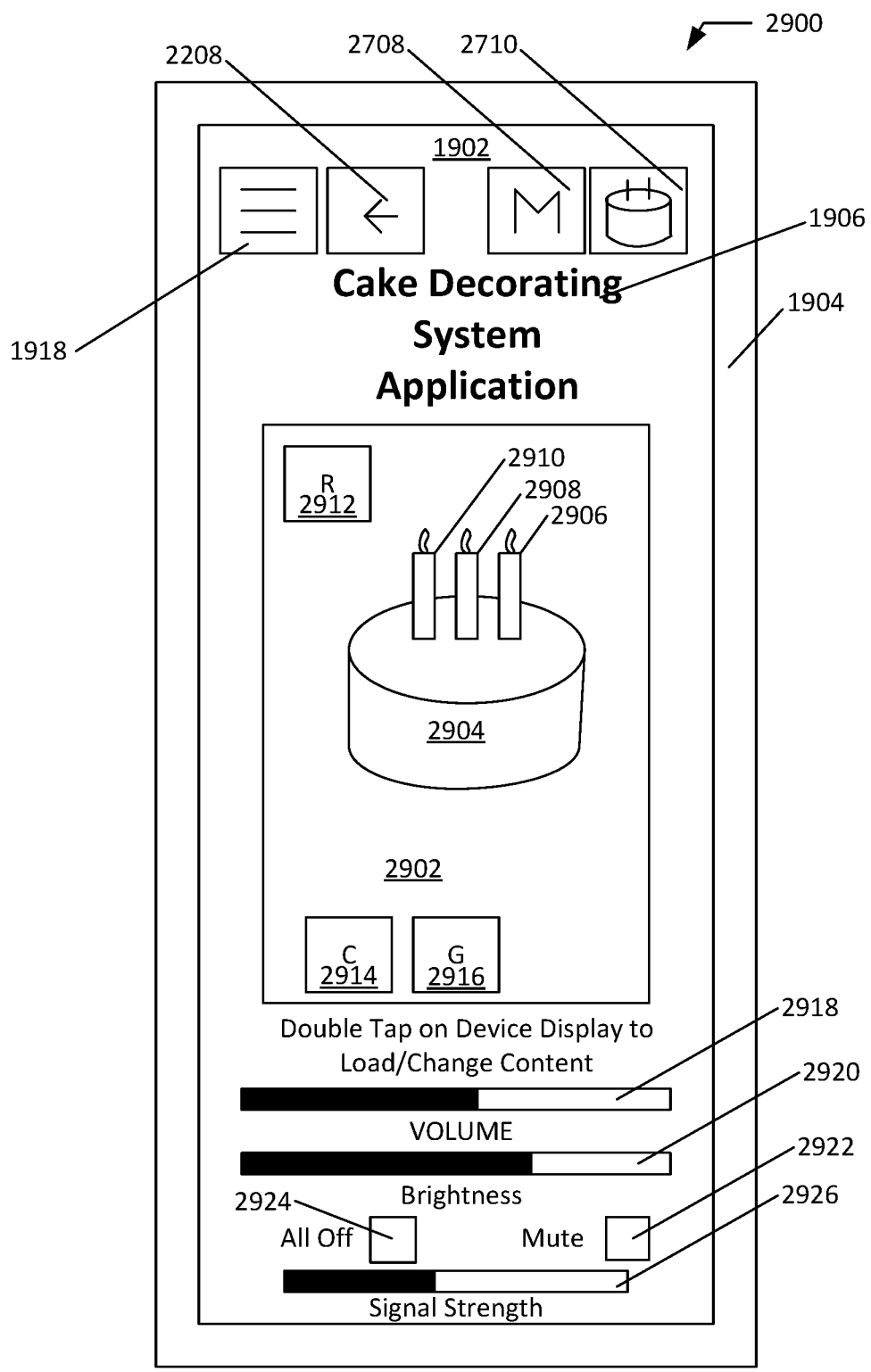
FIG. 29 is a diagram of a screen of a smart device that executes a CDS application that controls a "show" in accordance with an example implementation.

In FIG. 29, a diagram 2900 of a screen 1902 of a smart device 1904 that executes a CDS application 1906 that has a user interface that controls a "show" in accordance with an example implementation. The CDS display 2902 shows the CDS devices (cake display 2904, candles 2906, 2908, and 2910) that are arrangeable within the display 2902. The images in the display may be rotated using the rotate button 2912 in the CDS display 2902. A picture of the live room and decorations may be captured and displayed on CDS display 2902 using the camera button 2914. A user may switch between the picture view and a graphical image view of the CDS in the CDS display 2902 using the graphic button 2916. The volume of a "show" may be set using the volume slider 2918. The brightness of the "show" may also be set using slider 2920. The "show" may be turned off using the all off button 2924 or muted using the mute button 2922. An indication of the signal strength of the signal with the CDS devices is depicted in graphic 2926. The interface may also have the dropdown menu 1918, back button 2208, main menu button 2708, and CDS device list button 2710.

Figure 30:
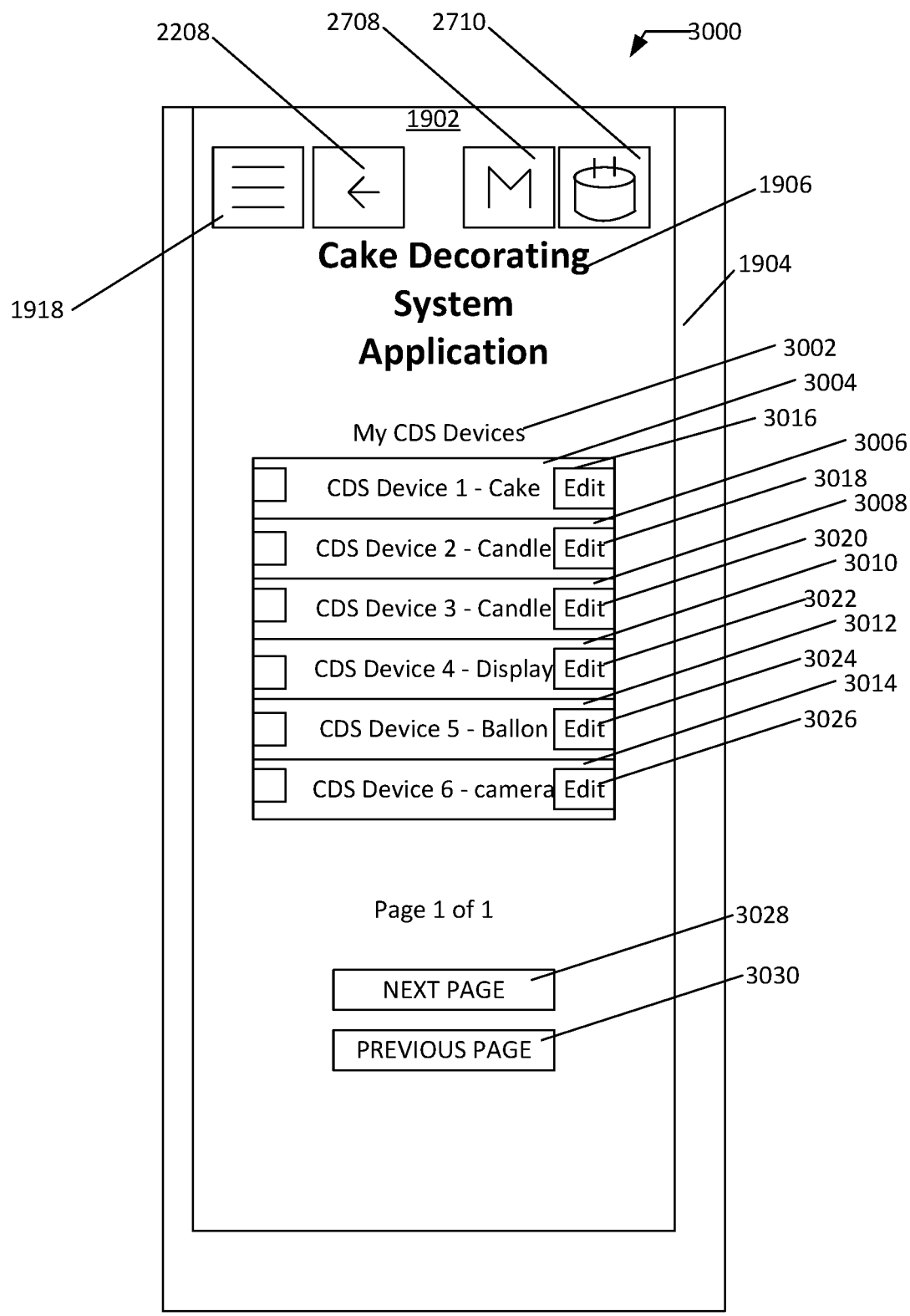
FIG. 30 is a diagram of a screen of a smart device that executes a CDS application that lists the CDS devices configured in the CDS in accordance with an example implementation.

Turning to FIG. 30, a diagram 3000 of a screen 1902 of a smart device 1904 that executes a CDS application 1906 provides an interface 3002 that lists the CDS devices configured is depicted in accordance with an example implementation. A list of the different configured CDS devices is provided 3004-3014 which are each editable 3016-3026. Multiple pages of CDS devices may be configured with the "NEXT PAGE" button 3028 and "PREVIOUS PAGE" button 3030 is used to move between pages in the interface 3002. The interface 3002 may also have the dropdown menu 1918, back button 2208, main menu button 2708, and CDS device list button 2710.

Figure 31:
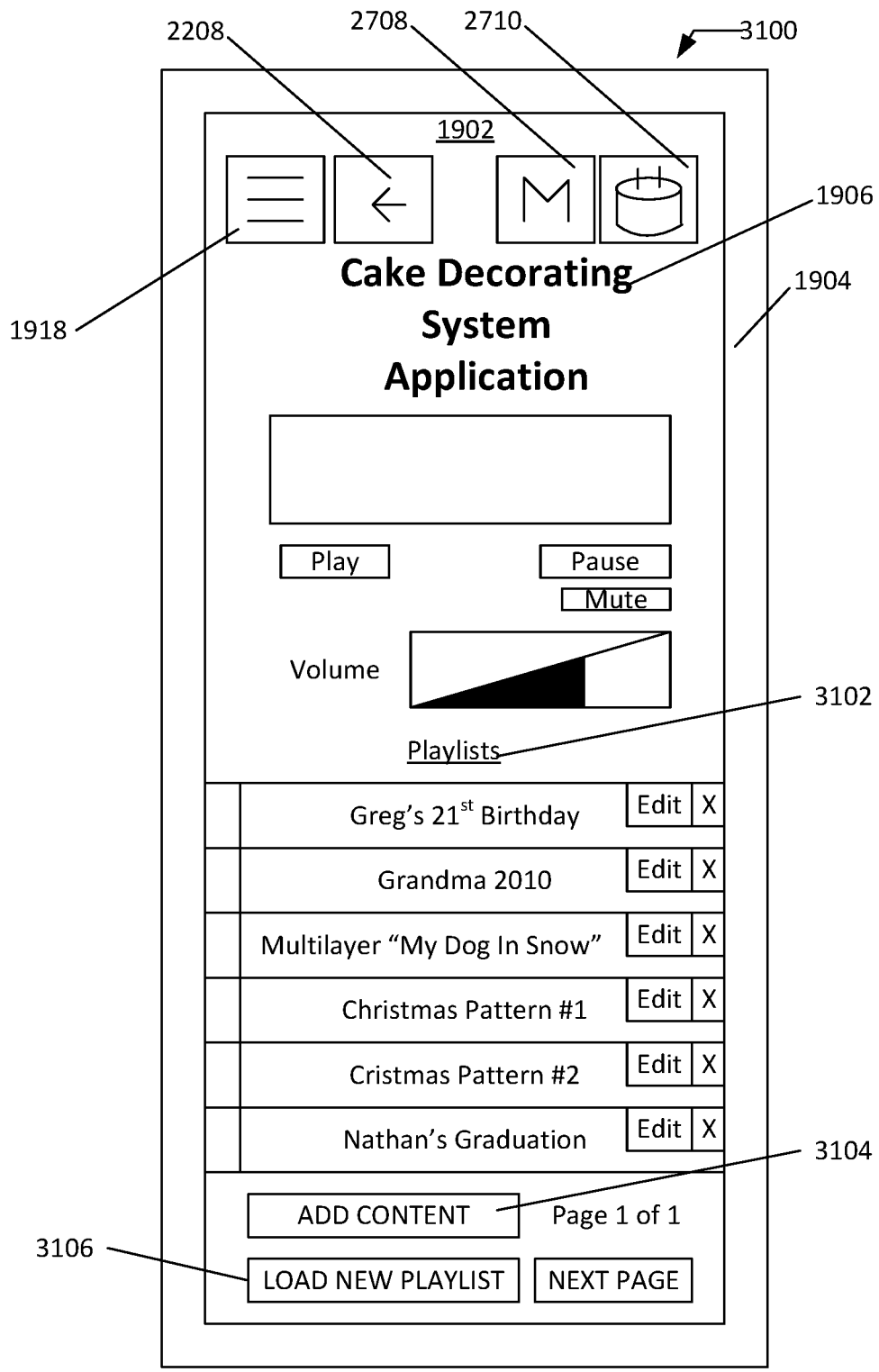
FIG. 31 is a diagram of a screen of a smart device that executes a CDS application that lists the playlist of shows in accordance with an example implementation.

In FIG. 31, a diagram 3100 of a screen 1902 of a smart device 1904 that executes a CDS application 1906 that provides a user interface for the playlist of shows 3102 is depicted in accordance with an example implementation. The different shows are listed and if needed, additional pages may be accessed. Content may be added with the "ADD CONTENT" button 3104 and a new playlist loaded with the "LOAD NEW PLAYLIST" button 3106. The interface 3102 may also have the dropdown menu 1918, back button 2208, main menu button 2708, and CDS device list button 2710.

Figure 32:
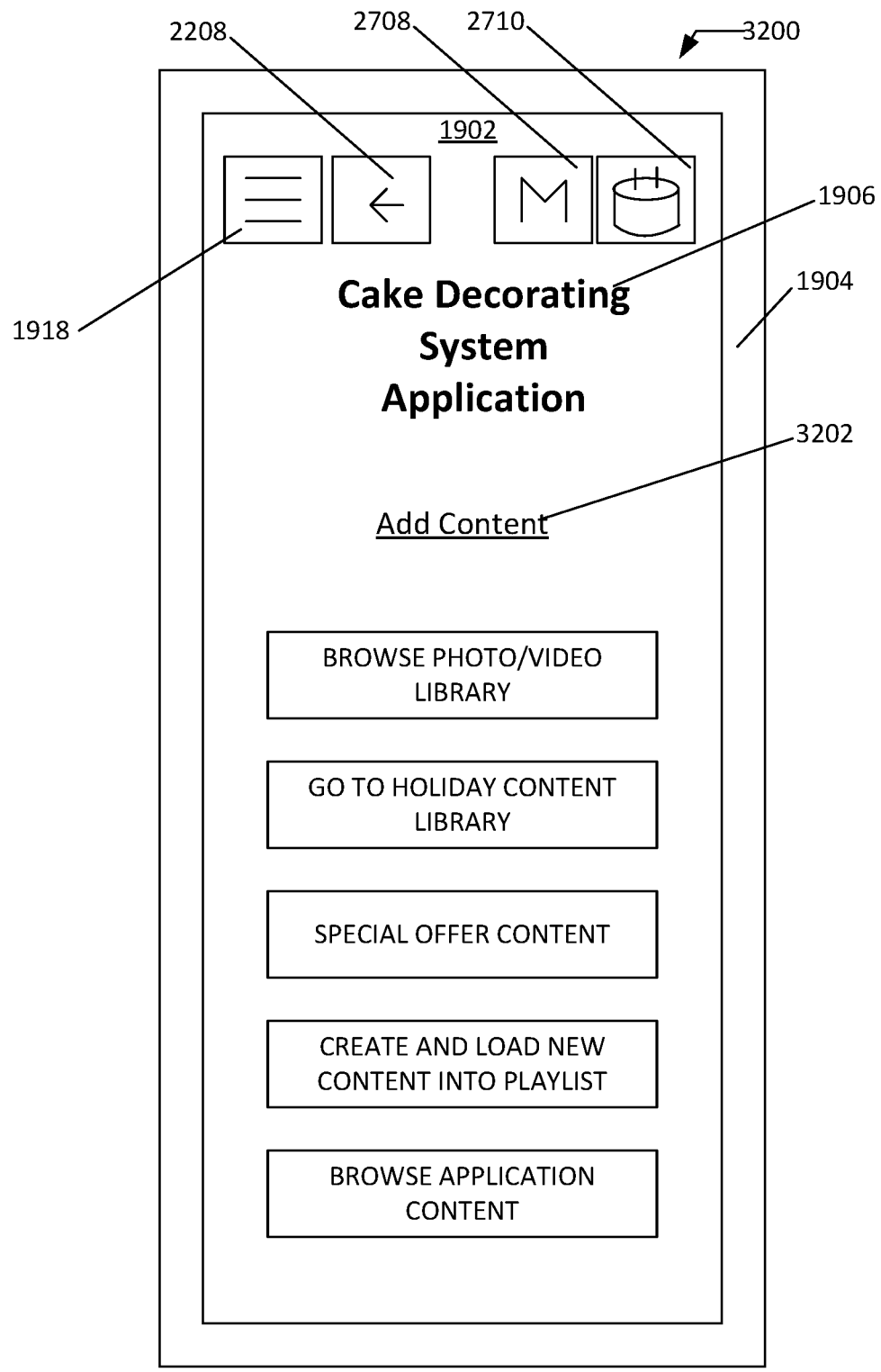
FIG. 32 is a diagram of a screen of a smart device that executes a CDS application that enables content in the CDS in accordance with an example implementation.

Turning to FIG. 32, a diagram 3200 of a screen 1902 of a smart device 1904 that executes a CDS application 1906 that provides an interface to add content 3202 in the CDS in accordance with an example implementation. Photographs, Holiday content, special offer content, loading content into a playlist, and just browsing CDS application content can be achieved in the interface to add content 3202. The interface 3202 may also have the dropdown menu 1918, back button 2208, main menu button 2708, and CDS device list button 2710.

Figure 33:
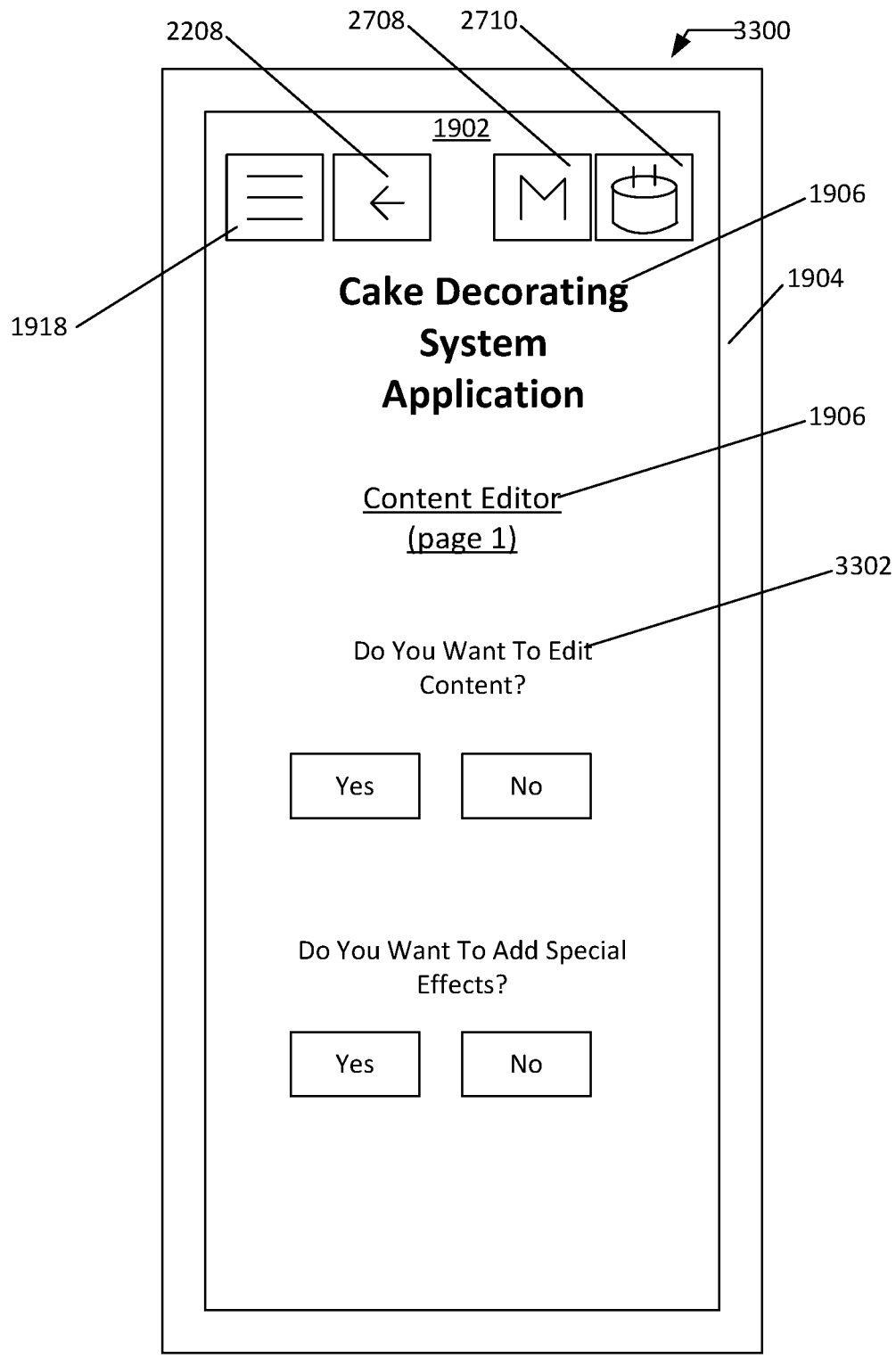
FIG. 33 is a diagram of a screen of a smart device that executes a CDS application that enables content to be edited in the CDS in accordance with an example implementation.

In FIG. 33, a diagram 3300 of a screen 1902 of a smart device 1904 that executes a CDS application 1906 with a user interface 3302 that enables content to be edited in the CDS in accordance with an example implementation. Content loaded in FIG. 32, may be edited using the controls and button in user interface 3302. The interface 3302 may also have the dropdown menu 1918, back button 2208, main menu button 2708, and CDS device list button 2710.

Figure 34:
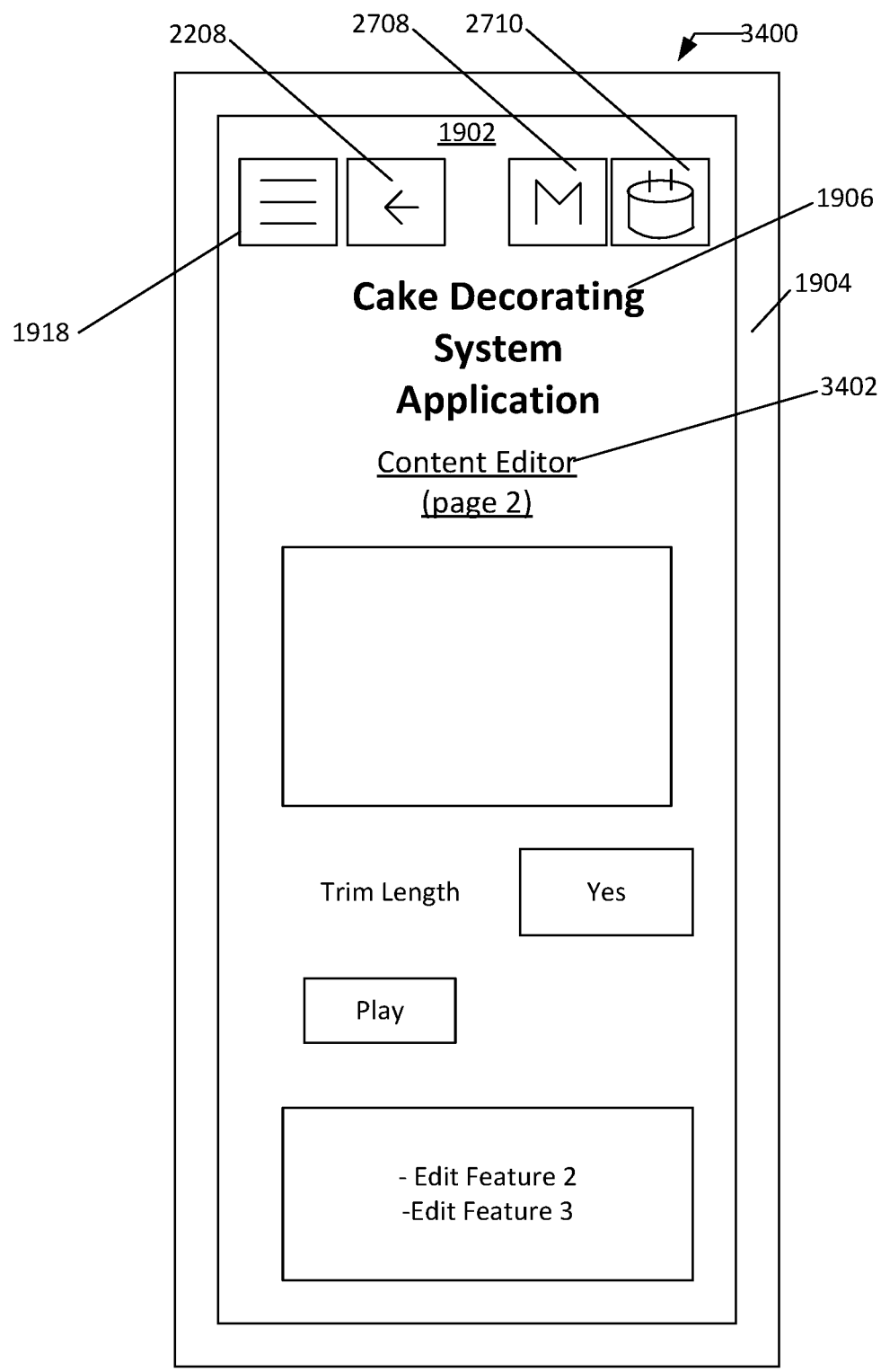
FIG. 34 is a diagram of a screen of a smart device that executes a CDS application that further enables content to be edited in the CDS in accordance with an example implementation.

Turning to FIG. 34, a diagram 3400 of a screen 1902 of a smart device 1904 that executes a CDS application 1906 with an interface 3402 that further enables content to be edited in the CDS in accordance with an example implementation is depicted. The interface 3402 may also have the dropdown menu 1918, back button 2208, main menu button 2708, and CDS device list button 2710.

Figure 35:
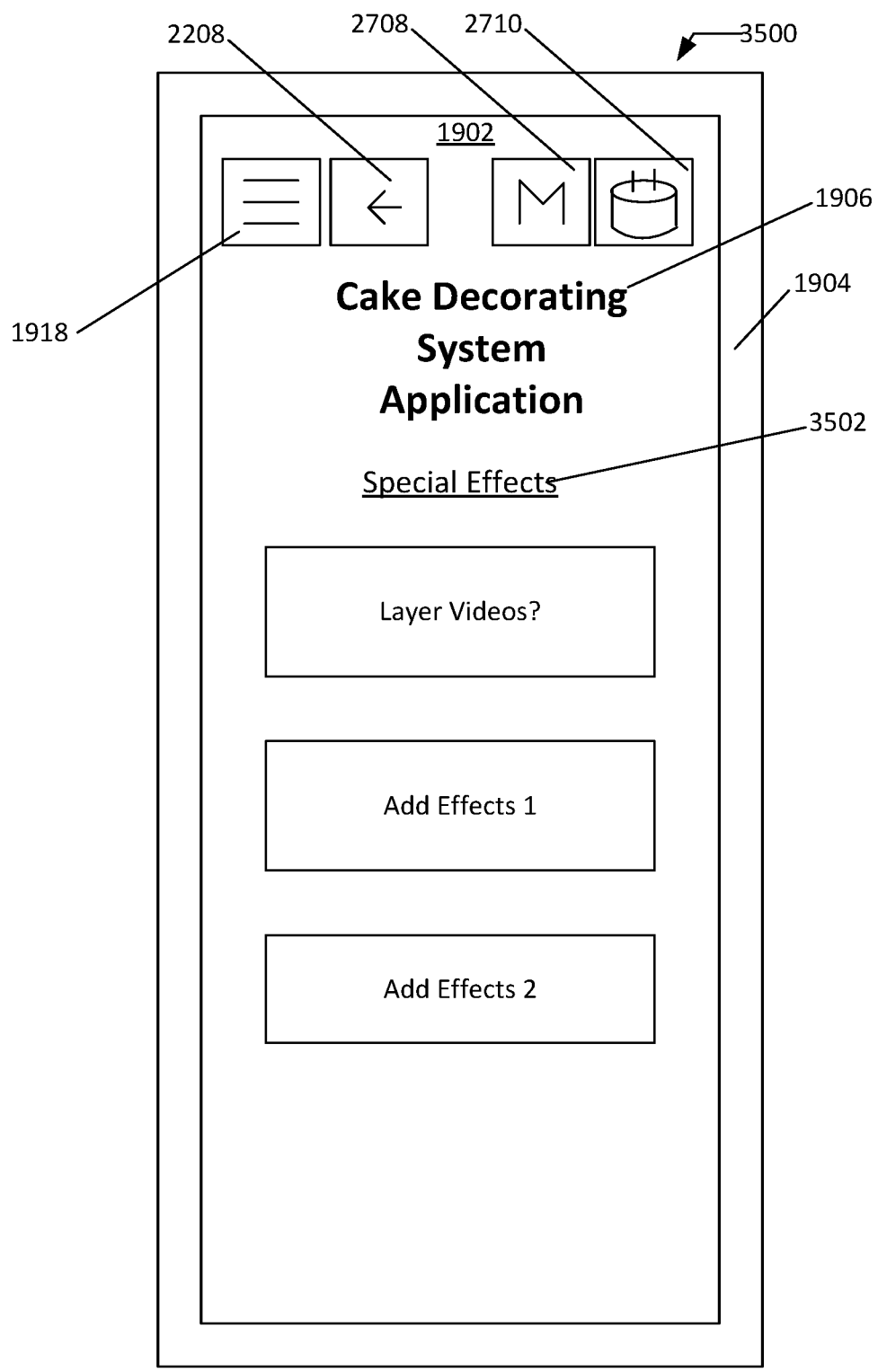
FIG. 35 is a diagram of a screen of a smart device that executes a CDS application that enables special effects to be added to content in the CDS in accordance with an example implementation.

In FIG. 35, a diagram 3500 of a screen 1902 of a smart device 1904 that executes a CDS application 1906 with a special effects interface 3502 that enables special effects to be added to content in the CDS in accordance with an example implementation. Videos may be layered, and pre-defined effects added, such as fading in, fading out, animations, ect. . . . The interface 3502 may also have the dropdown menu 1918, back button 2208, main menu button 2708, and CDS device list button 2710.

Figure 36:
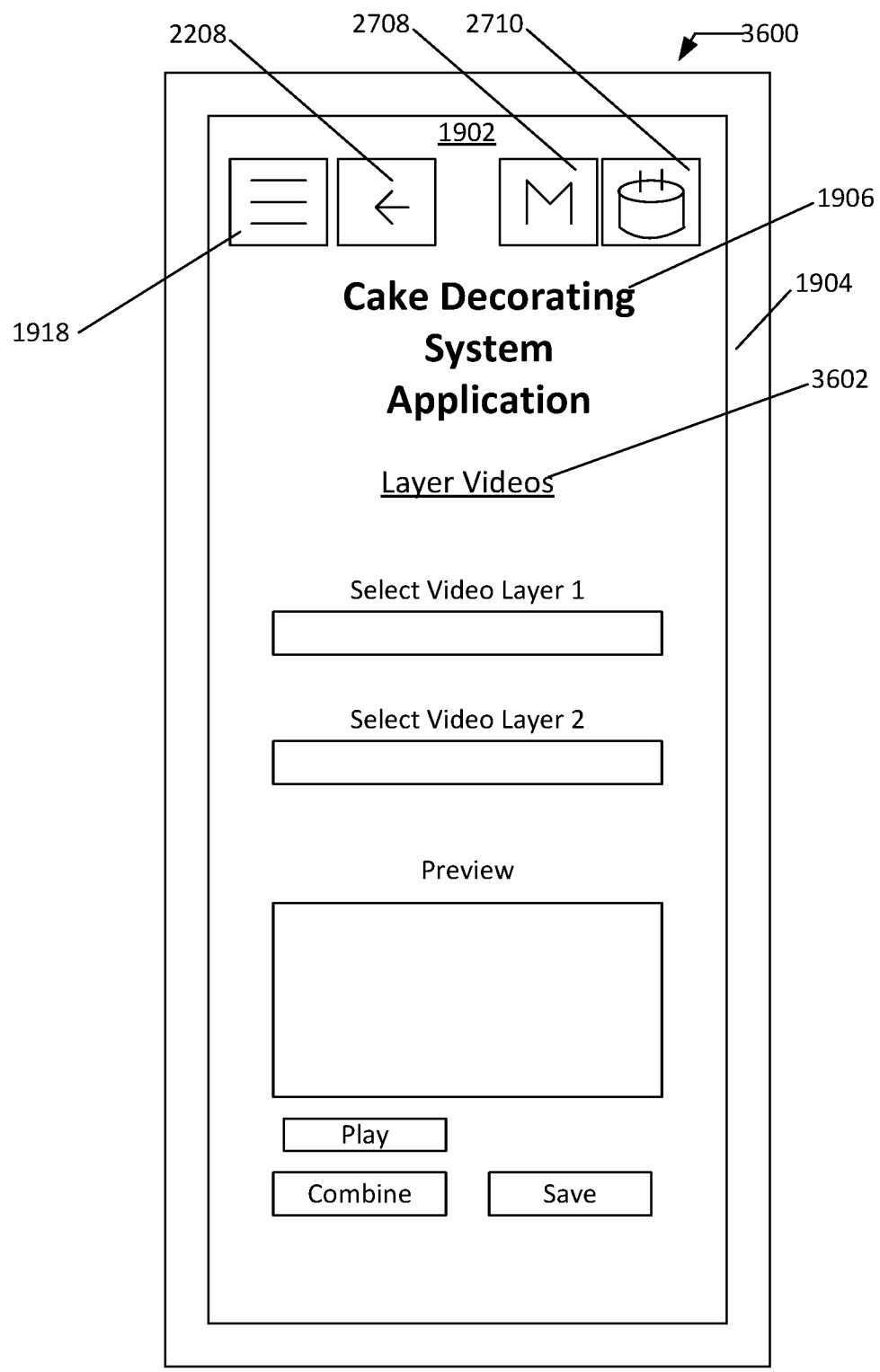
FIG. 36 is a diagram of a screen of a smart device that executes a CDS application that enables special effects of layering to be added to content in the CDS in accordance with an example implementation.

Turning to FIG. 36, a diagram 3600 of a screen 1902 of a smart device 1904 that executes a CDS application 1906 with a layer videos interface 3602 that enables special effects of layering to be added to content in the CDS in accordance with an example implementation. Videos to be layered may be selected and the layered videos combined and previewed. If the layering is acceptable, the layered video can be saved. The interface 3602 may also have the dropdown menu 1918, back button 2208, main menu button 2708, and CDS device list button 2710.

Figure 37:
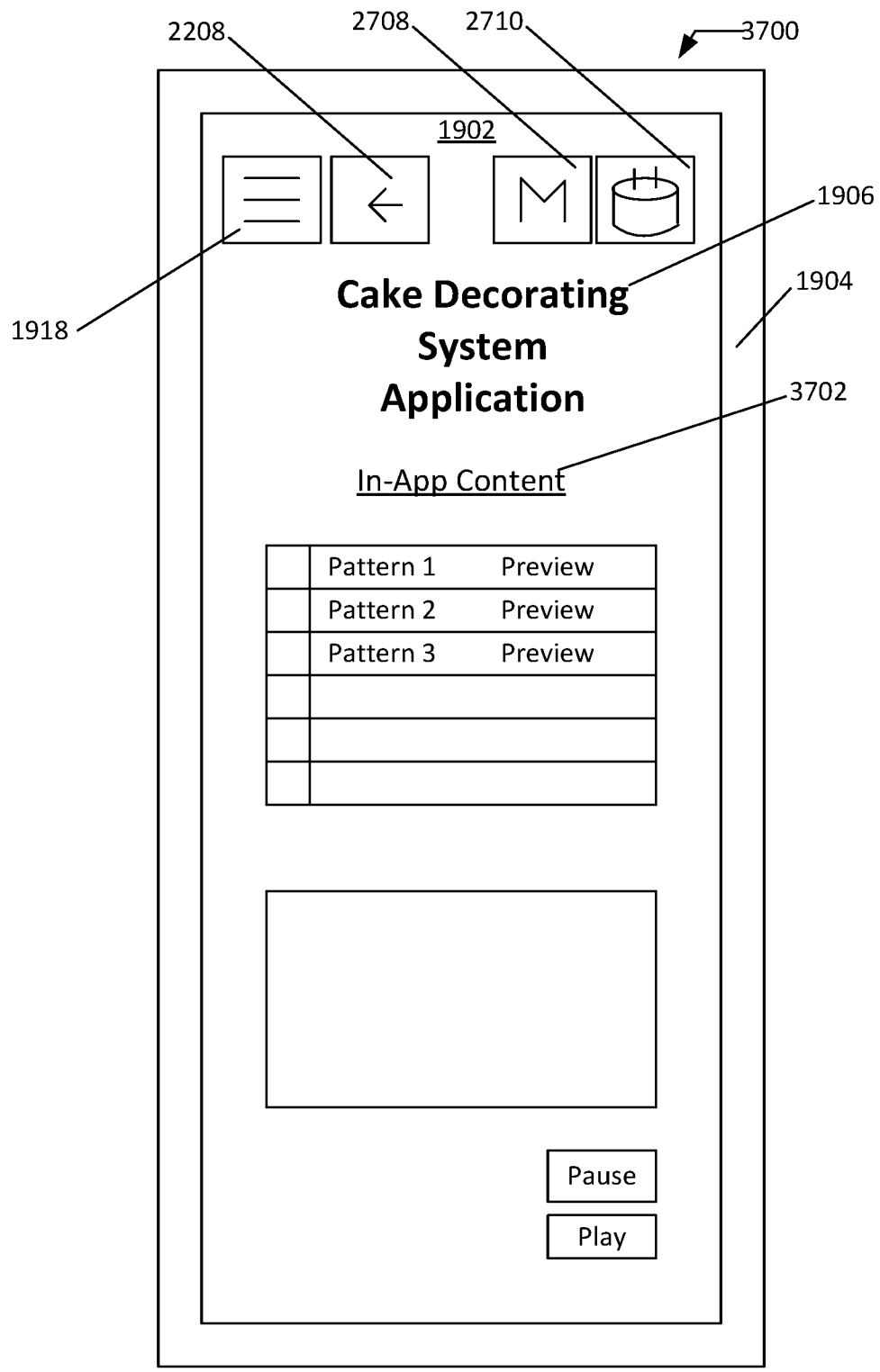
FIG. 37 is a diagram of a screen of a smart device that executes a CDS application that enables special effects of patterns to be added to content in the CDS in accordance with an example implementation.

In FIG. 37, a diagram 3700 of a screen 1902 of a smart device 1904 that executes a CDS application 1906 with an In-App Content interface 3702 that enables special effects, such as patterns to be added to content in the CDS in accordance with an example implementation. The interface 3702 may also have the dropdown menu 1918, back button 2208, main menu button 2708, and CDS device list button 2710.

Figures 38A, 38B:
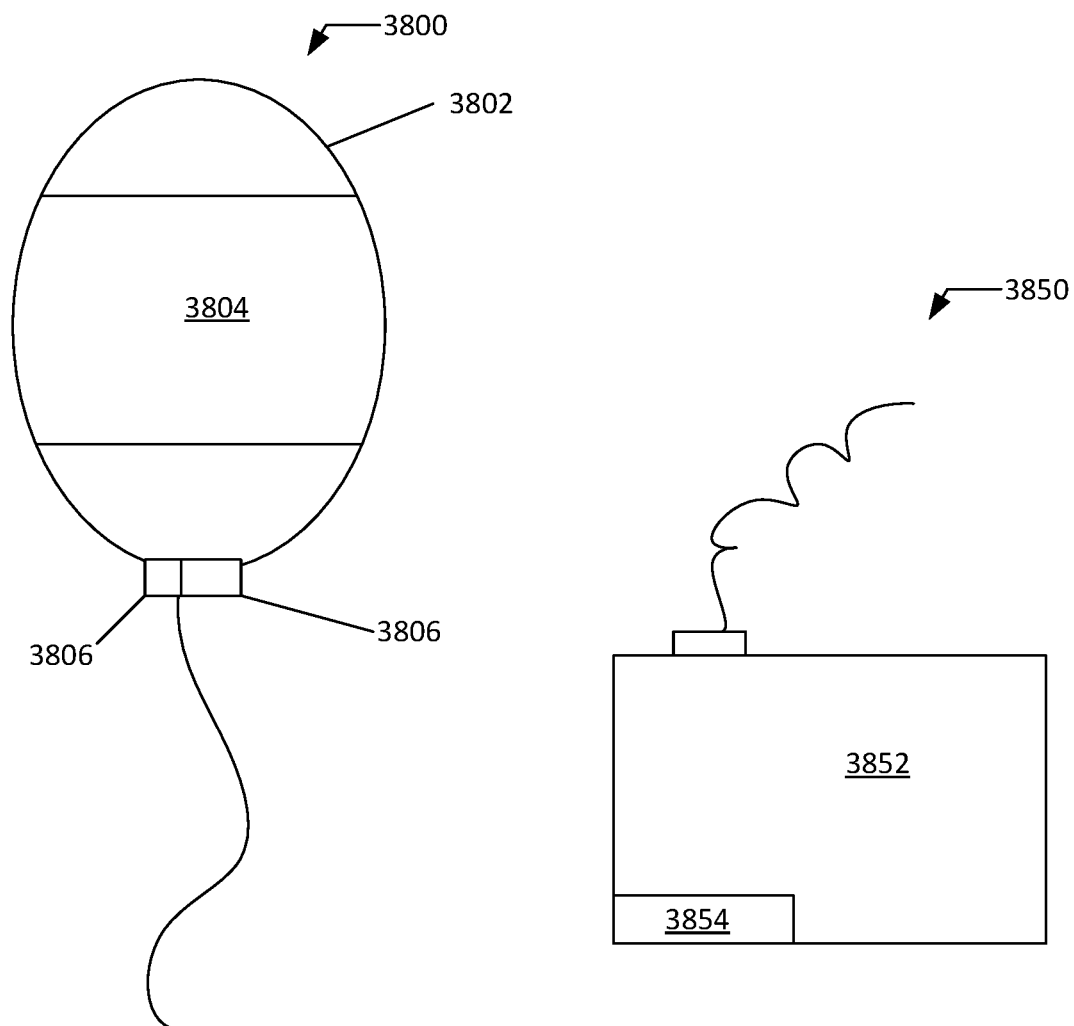
FIG. 38A is a diagram of a balloon with a flexible screen coupled to a power supply and controller that incorporates a transceiver in accordance with an example implementation.
FIG. 38B is a diagram of a scent generator having a controller with an integrated transceiver in accordance with an example implementation.

Turning to FIG. 38A, a diagram 3800 of a balloon 3802 with a flexible screen 3804 coupled to a power supply 3806 and controller 3806 that incorporates a transceiver is depicted in accordance with an example implementation. The balloon 3802 is an example of a CDS device and can be configured as other CDS devices. Flexible screen balloons that are "smart deco," i.e., interact with each other, CDS, in some implementations act as independent devices, and interact with a third-party system (e.g., iHoliday SmartDecco). In other implementations, the screen and controllers, sensors, and transceivers are affixed to a standard balloon making a standard balloon or another device a CDS device.

In FIG. 38B, a diagram 3850 of a scent generator 3852 having a controller 3854 with an integrated transceiver is depicted in accordance with an example implementation. The scent generator 3852 is another example of a CDS device and can be configured as other CDS devices. In other implementations, electronic devices such as toys, drones, interactive picture frames and other smart decco, smart clothing may be configured as CDS devices and included in a CDS "show." Just as screens may be placed on cakes and candles, CDS screens may be placed on plates and cutlery. The screens can be coordinate with pieces of cake or pie that have smaller screens affixed to them (e.g. on the top or side of a piece). Furthermore, cake camera(s) can be placed on cakes (similar to candle cameras) to capture the candle being blown out and other festivities.

Figure 39:
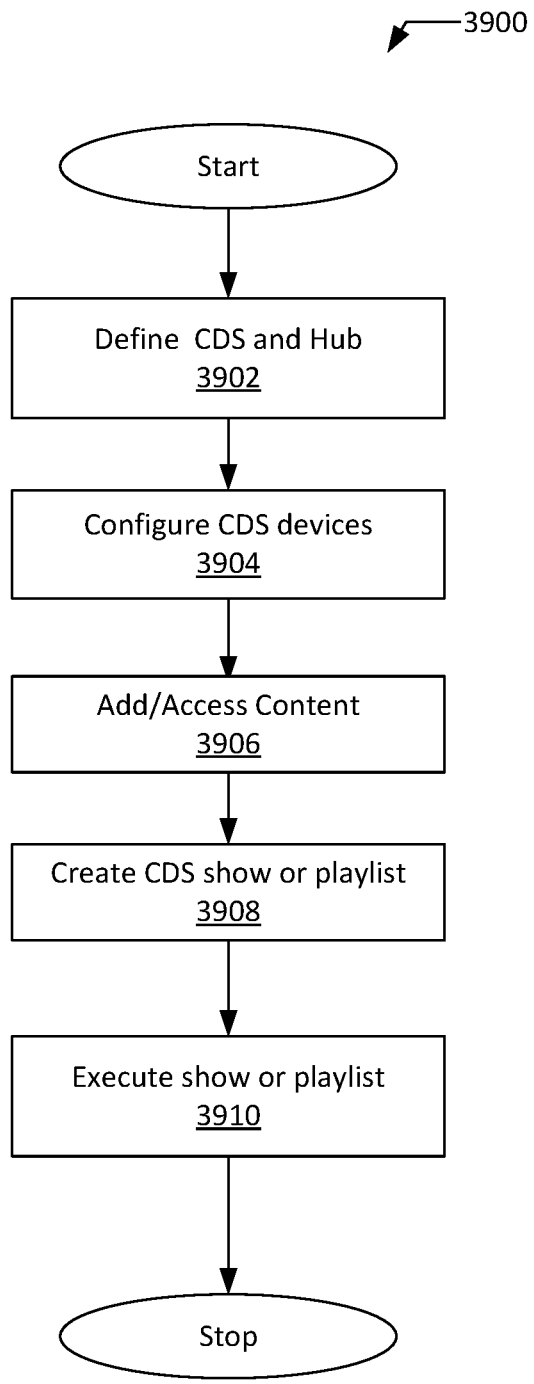
FIG. 39 is a flow diagram of a CDS configuration approach in accordance with an example implementation.

Turning to FIG. 39, a flow diagram of a CDS configuration approach is depicted in accordance with an example implementation. A CDS system and HUB are configured in step 3902. Devices that may be used in the CDS system are defined in step 3904. Content is added, such as video, music, and pictures in step 3906. A show or playlist is defined using the CDS HUB, CDS devices, and content in step 3908. The show or playlist is executed in step 3910. In some implementations, the defined elements CDS HUBs, CDS devices, and content are stored and accessed from the internet or "cloud" via a network.

It will be understood and is appreciated by persons skilled in the art, that one or more approaches, processes, sub-processes, or process steps described may be performed by hardware and/or software (machine-readable instructions). If the approach is performed by software, the software may reside in software memory in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in a computer memory.

In preferred implementations of the invention the CDS can communicate and display content on one or more CDS displays in coordination with displays on other devices and/or other functions performed on other devices, such as smart phones, smart balloon devices, drones, interactive ornament devices, such as those as described in U.S. Pat. Nos. 7,248,230 and/or 8,462,079, interactive drumstick controllers, such as those described in U.S. Pat. Nos. 9,117,427 and/or 9,502012, and wearable computer devices and digital name tag devices, such as name tags with proximity capacity. The text of each of the aforementioned United States Patents is included by reference in their respective entirety as though set forth in full.

In some embodiments of the invention the aforementioned smart balloon devices comprise balloons that comprise or have disposed on all or part of their surface a flexible digital display, one or more controller devices and a power supply capable of wirelessly receiving content for display on the aforementioned digital display.

In some preferred implementations of the invention the CDS is controlled by voice recognition means.

In some preferred implementations of the invention the show displayed on the CDS is displayed in coordination with content displayed on one or more smart devices and/or one or more virtual reality devices.

In some preferred embodiments of the invention the aforementioned coordination includes a summoning feature that enables users running an CDS app that enables notification of the commencement of a CDS show that the show has commenced or is about to commence. In some embodiments of the invention, this feature also provides to such users a graphical location of the cake or other item on which the CDS display(s) are currently located.

In some implementations of the invention content is provided to the CDS via one or more applications running on one or more smart devices as depicted in the remaining figures.

The foregoing detailed description of one or more embodiments of the approach for a CDS has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A holiday decoration, comprising:
    a first base with a controller;
    a power connector adapted to couple with a power source and a termination point;
    a support member supported by the first base; and
    a light emitting element supported by the support member and coupled to the controller and power connector, wherein the termination point is adapted to couple with an at least a second base and the controller responding to a show signal received from the termination point where the show signal is saved in memory at the controller.

2. The holiday decoration of claim 1, wherein the termination point is coupled to a bus that carries electrical power from the power source.

3. The holiday decoration of claim 1, wherein the termination point receives at least one data signal.

4. The holiday decoration of claim 3, wherein the termination point also receives electrical power from the power source.

5. The holiday decoration of claim 3, wherein the termination point is a wireless termination point.

6. The holiday decoration of claim 1, wherein the light emitting element is a display capable of displaying graphical images.

7. The holiday decoration of claim 1, wherein the light emitting element is a display capable of displaying video images.

8. The holiday decoration of claim 1, wherein the light emitting element is an light emitting diode.

9. The holiday decoration of claim 1, wherein the support member is wax with a wick that when lite, results in a signal being received at the controller.

10. The holiday decoration of claim 9, where a sensor generates the signal.

11. The holiday decoration of claim 1 further comprising, at least a receiver that receives coupled to the controller that receives the show signal, where the show signal when activated results in the controller activating the light emitting element in response to the show signal.

12. The holiday decoration of claim 11, where the receiver is part of a transceiver.

13. The holiday decoration of claim 1, further includes a speaker coupled to the controller.

14. The holiday decoration of claim 1, where the show signal contains audio and visual data.

15. The holiday decoration of claim 1, where the power connector connects to the power source located in the first base.

16. The holiday decoration of claim 1, where the power connector connects to the power source located in the support member.

17. The holiday decoration of claim 1, where the power connector connects to the power source located external to the holiday decoration.

18. The holiday decoration of claim 1, where the first base is a power hub having more than one power connectors that are adapted to supply power to at least the second base.

19. The holiday decoration of claim 1, includes, a receiver that receives a wireless signal that contains the show signal.

20. The holiday decoration of claim 1, where a sound generation device is coupled to the controller and coordinates generation of sound.

* * * * *